(12) United States Patent
Lee et al.

(10) Patent No.: US 9,469,237 B2
(45) Date of Patent: Oct. 18, 2016

(54) LOADING SPACE VARIABLE REFRIGERATION SYSTEM OF REFRIGERATOR CAR

(71) Applicants: Hyun-Soo Lee, Ottawa (CA); A-Gi Kim, Gaegun-myeon (KR)

(72) Inventors: Hyun-Soo Lee, Ottawa (CA); A-Gi Kim, Gaegun-myeon (KR)

(*) Notice: Subject to any disclaimer, the term of this patent is extended or adjusted under 35 U.S.C. 154(b) by 1 day.

(21) Appl. No.: 14/429,558

(22) PCT Filed: Oct. 29, 2014

(86) PCT No.: PCT/KR2014/010241
§ 371 (c)(1),
(2) Date: Mar. 19, 2015

(87) PCT Pub. No.: WO2016/068357
PCT Pub. Date: May 6, 2016

(65) Prior Publication Data
US 2016/0121780 A1 May 5, 2016

(51) Int. Cl.
*B60P 3/20* (2006.01)
*B62D 33/04* (2006.01)

(52) U.S. Cl.
CPC ............... *B60P 3/205* (2013.01); *B60P 3/20* (2013.01); *B62D 33/042* (2013.01)

(58) Field of Classification Search
CPC ......... B60P 3/20; B60P 3/205; B62D 33/042
USPC ................. 296/24.35, 24.4, 24.41, 181.6
See application file for complete search history.

(56) References Cited

U.S. PATENT DOCUMENTS

| | | | | |
|---|---|---|---|---|
| 993,909 | A * | 5/1911 | Thompson | B60P 3/205 410/130 |
| 3,638,450 | A * | 2/1972 | Falk | B60P 3/205 160/23.1 |
| 6,086,128 | A * | 7/2000 | Whitehead, Sr. | B60P 7/14 160/354 |
| 7,393,034 | B2 * | 7/2008 | Brussard | B60P 3/205 16/35 R |
| 2006/0192402 | A1 * | 8/2006 | Mirabella | B60P 3/20 296/24.41 |
| 2009/0142154 | A1 * | 6/2009 | Hammond | B60P 3/205 410/130 |

FOREIGN PATENT DOCUMENTS

IT EP 2535223 A1 * 12/2012 ............. B60P 3/205

* cited by examiner

*Primary Examiner* — Jason S Daniels
(74) *Attorney, Agent, or Firm* — Kagan Binder, PLLC

(57) ABSTRACT

Disclosed is a loading space variable refrigeration system of a refrigerator vehicle, which can vary a loading space in a refrigeration trailer of a refrigerator vehicle according to volume of loads, thereby reducing fuel and oil costs for cool-air supply and can rapidly vary the loading space through simple operator manipulation. The refrigeration system includes a horizontal bulkhead moving in an upper space of the refrigeration trailer and defining the upper space and a vertical bulkhead moving in a rear space of the refrigeration trailer and defining the rear space, wherein an uncooling region is set in a cooling space of the refrigeration trailer by the horizontal and vertical bulkheads.

31 Claims, 31 Drawing Sheets

(a)

(b)

(a)

(b)

(a)

(b)

(a)

(b)

(a)

(b)

(a)

(b)

(a)

(b)

(a)

(b)

LOADING SPACE VARIABLE REFRIGERATION SYSTEM OF REFRIGERATOR CAR

TECHNICAL FIELD

The present invention relates to a loading space variable refrigeration system of a refrigerator vehicle, and more particularly, to a loading space variable refrigeration system of a refrigerator vehicle, which can vary a loading space in a refrigeration trailer of a refrigerator vehicle according to volume of loads, thereby reducing fuel and oil costs for cool-air supply, and rapidly varying the loading space through simple operator manipulation.

BACKGROUND ART

In general, refrigerator vehicles are used to carry loads such as food products that may lose freshness thereof depending upon temperature.

Refrigerator vehicles for carrying various types of frozen or low-temperature foods/goods that cannot be stored or carried at room temperature may be classified into small straight trucks and medium and large semi-trailers according to a type and load capacity thereof. It should be understood that, terms, such as refrigerator vehicles, refrigeration trailers and refrigerators, as used herein, do not mean only refrigerating functions excluding freezing functions, and comprehensively include terms such as freezer vehicles, freezing trailers, and freezers.

As shown in FIG. 1, a refrigerator vehicle is provided at a loading station thereof with a refrigeration trailer 20 having an enclosure shape, and a refrigerator 21 is provided at a head side of the refrigerator vehicle or at one upper side of the refrigeration trailer 20. The inner space of the refrigeration trailer 20 is maintained at a low temperature by an evaporator of the refrigerator 21. The refrigerator 21 is usually an engine driven refrigerator that is driven by a main engine or sub-engine of the refrigerator vehicle.

In a refrigeration cycle of the refrigerator 21, a refrigerant circulates via circulation pipes in order of compressor, condenser, expander, and evaporator.

Operation of the refrigerator 21 is as follows: the compressor is driven by power of a sub-engine provided at the refrigeration trailer 20, a high-temperature, low-pressure refrigerant is changed into a medium-temperature, high-pressure refrigerant in the condenser as the compressor is driven, the refrigerant supplied from the condenser passes through the expansion valve and flows into the evaporator, the liquid refrigerant absorbs ambient heat while being instantaneously gasified, and cool air is created around the evaporator and discharged into the refrigeration trailer 20 by a separate exhaust fan.

Through constant repetition of the refrigeration cycle, the inner space of the refrigeration trailer 20 is maintained at a preset low temperature, which makes it possible to stably carry all foods and beverages required to be refrigerated or frozen and low-temperature goods under an optimal temperature condition.

FIG. 2 shows an interior of the refrigeration trailer in the related art.

Cool air supplied by the refrigerator 21 is fed into all spaces in the refrigeration trailer 20 through a duct 30 disposed at an upper portion of the refrigeration trailer 20. The duct 30 is open at some portions of left and right sides thereof and at a distal end thereof. As shown in FIG. 2, some cool air is supplied to loads (L) through the left and right openings, and the rest is supplied through the distal opening to the inner space of the refrigeration trailer 20 and circulates therein.

However, the refrigeration system of the refrigeration trailer 20 supplies cool air into the refrigeration trailer 20 irrespective of quantity and volume of the loads (L) in order to maintain the entire inner space of the refrigeration trailer 20 at a preset temperature, which causes unnecessary energy (heat or fuel) consumption even when the loads (L) are small in quantity and volume.

Although refrigerator vehicle have an intake weight determined according to classes thereof, the refrigerator vehicle inevitably have a loading space left in a refrigeration trailer when carrying loads, such as ice cream, having heavy weight and small volume.

That is, as shown in FIG. 2, even when the refrigeration trailer 20 is not completely filled with loads (L), the entire inner space thereof is maintained at a low temperature, thereby causing high fuel and oil costs and overload of the refrigeration system in long-distance transportation.

In order to solve this problem, attempts have been made to divide an inner space of a refrigeration trailer using fixed partition walls. However, such attempts are inefficient for real-life situations in which loads are always variable in quantity and volume, and cause limitation in quantity of loads and inconvenience of a loading operation.

DISCLOSURE

Technical Problem

The present invention has been conceived to solve such problems in the related art and is aimed at providing a loading space variable refrigeration system of a refrigerator vehicle, which can vary a loading space in a refrigeration trailer of a refrigerator vehicle according to volume of loads.

Technical Solution

In accordance with one aspect of the present invention, a loading space variable refrigeration system of a refrigerator vehicle includes: a horizontal bulkhead defining an upper space in a refrigeration trailer; and a vertical bulkhead defining a rear space in the refrigeration trailer, wherein an uncooling region is set in a cooling space of the refrigeration trailer by the horizontal and vertical bulkheads.

The horizontal or vertical bulkhead may be movable.

The horizontal bulkhead may be moved upwards and downwards in the refrigeration trailer to set a lower cooling space to which cool air is transferred and an upper uncooling region to which cool air is not transferred.

The vertical bulkhead may be moved forwards and rearwards in the refrigeration trailer to set a front cooling space to which cool air is transferred and a rear uncooling region to which cool air is not transferred.

A plurality of horizontal bulkheads may be arranged parallel to a ceiling of the refrigeration trailer in a horizontal direction, and the horizontal bulkheads selected according to operator control or all the horizontal bulkheads may be moved downwards.

The horizontal bulkheads may have a plate-shaped structure made of a material to block air flow.

Each of the horizontal bulkheads may be provided on an upper surface thereof with an insertion portion and have inclined front and rear sides, wherein the front side may be formed as an inclined support surface supporting another horizontal bulkhead opposite thereto and the rear side may be formed as an inclined coupling surface supported by another horizontal bulkhead opposite thereto.

The refrigeration system may further include a hoist moving all the horizontal bulkheads or the selected horizontal bulkheads upwards and downwards, wherein the hoist may include: a control key controlled by an operator; a plurality of wires wound or unwound by rotation of the control key; and pulleys disposed above the horizontal bulkheads such that the wires are wound therearound, wherein each of the wires passing over the corresponding pulley may be secured at a distal end thereof to the corresponding horizontal bulkhead, and when the control key is rotated to unwind the wire, the horizontal bulkhead connected to the wire may be moved downwards.

Stopping pieces may be formed at both sides of each horizontal bulkhead facing side surfaces of the trailer, stoppers that are to be changed in position may be provided on the side surfaces of the trailer facing the stopping pieces of the horizontal bulkhead to selectively move the horizontal bulkhead downwards, and the stoppers may be switched to a lock position against the specific horizontal bulkhead such that the stopping pieces of the corresponding horizontal bulkhead are stopped by the stoppers, which prevents the horizontal bulkhead from moving downwards.

The horizontal bulkhead may include a plurality of unit horizontal bulkheads that are to move upwards and downwards and to be changed in position, and heights and positions of the unit horizontal bulkheads may be adjusted by operator control to conform to heights according to horizontal positions of loads in the refrigeration trailer.

The horizontal bulkhead may be formed of a flexible material and partially deformed by operator control to conform to heights according to horizontal positions of loads.

Cool air may be supplied through a cool-air supply hole provided at a front end of the refrigeration trailer and transferred to an inner space of the refrigeration trailer through a duct provided on a lower surface of the horizontal bulkhead, and a front end portion of the duct may be formed of an extensible flexible material or a bellows tube.

The duct may be secured to the lower surface of the horizontal bulkhead and divided into a plurality of parts that are separated from one another according to selective upward and downward movement of horizontal bulkheads, and the cool air may be discharged from the duct secured to the rearmost of the lowered horizontal bulkheads.

The duct may be secured to the lower surface of the horizontal bulkhead and include a main air passage formed in a longitudinal direction of the refrigeration trailer and auxiliary air passages formed at left and right sides of the main air passage, wherein the main air passage may discharge the cool air to a rear end of the refrigeration trailer, and the auxiliary air passages may discharge the cool air through a plurality of through-holes formed on side surfaces thereof.

The main air passage may be divided into a plurality of parts in the longitudinal direction of the refrigeration trailer, each of which may have an opening/closing door capable of discharging the cool air.

The vertical bulkhead which is to be rotated by a rotating shaft secured to an upper inner surface of the refrigeration trailer may normally make surface-to-surface contact with an inner surface of the trailer and, in setting an uncooling region, may be rotated about the rotating shaft and arranged parallel to a gate of the refrigeration trailer.

The vertical bulkhead may have a plate-shaped structure made of a material to block air flow.

An air blocking section formed in a concave-convex pattern corresponding to that of a bottom surface of the trailer may be attached to a lower portion of the vertical bulkhead.

The refrigeration system may further include a transfer apparatus moving the vertical bulkhead forwards and rearwards, wherein the transfer apparatus may include: a rail secured to a lower surface of the horizontal bulkhead; a movable guide moving forwards and rearwards along the rail; a wire provided at the movable guide, wherein the rotating shaft supporting the vertical bulkhead may be connected at an upper end thereof to the movable guide and moved forwards and rearwards by the movable guide.

The refrigeration system may further include a connector serving as an auxiliary upper closing member for the horizontal bulkhead.

The connector may have a plate-shaped structure made of a material to block air flow.

The connector may be suspended from the movable guide of the transfer apparatus by the wire while being parallel to a ceiling of the refrigeration trailer, moved downwards according to movement of the movable guide and operator manipulation of the wire, and inserted into an insertion portion of the horizontal bulkhead to subsidiarily determine a height of the uncooling region.

The vertical bulkhead may include an upper sliding plate and a lower sliding plate engaged with the upper sliding plate and sliding thereon, wherein the vertical bulkhead may be normally secured to a horizontal bulkhead side while being parallel to the horizontal bulkhead, with the upper and lower sliding plates superposed on each other, and in setting an uncooling region, erected with the lower sliding plate sliding downward on the upper sliding plate.

The upper sliding plate may be formed at a distal end thereof with a clamp pressing a duct, through which cool air flows, while the corresponding vertical bulkhead is erected.

The upper sliding plate may be formed at both sides thereof with upper foldable seals to prevent cool air from leaking to the uncooling region through both sides thereof, and the lower sliding plate may be formed at both sides thereof with lower foldable seals to prevent the cool air from leaking to the uncooling region through both the sides thereof.

An air blocking section formed in a concave-convex pattern corresponding to that of a bottom surface of the trailer may be attached to a distal end of the lower sliding plate.

The refrigeration system may further include a transfer apparatus moving the vertical bulkhead forwards and rearwards, wherein the transfer apparatus may include: a rail secured to a lower surface of the horizontal bulkhead; a movable guide moving forwards and rearwards along the rail; a wire provided at the movable guide, wherein the upper sliding plate of the vertical bulkhead may be rotatably coupled to the movable guide and moved forwards and rearwards by the movable guide.

The vertical bulkhead may include a plurality of panels sequentially connected to one another and formed to be bendable, wherein all the panels may be normally secured to a horizontal bulkhead side while being parallel to the horizontal bulkhead and erected to set an uncooling region.

Each of the panels may be formed at both sides thereof with foldable seals to prevent cool air from leaking to the uncooling region through both sides thereof.

An air blocking section formed in a concave-convex pattern corresponding to that of a bottom surface of the trailer may be attached to the lowermost panel of the vertical bulkhead.

The refrigeration system may further include a transfer apparatus moving the vertical bulkhead forwards and rearwards, wherein the transfer apparatus may include: a rail secured to a lower surface of the horizontal bulkhead; a movable guide moving forwards and rearwards along the rail; a support track coupled to the movable guide; and a clamp secured to an upper portion of the movable guide and pressing a duct through which cool air flows, wherein the upper sliding plate of the vertical bulkhead may be rotatably coupled to the movable guide and moved forwards and rearwards by the movable guide.

In accordance with another aspect of the present invention, a loading space variable refrigeration system of a refrigerator vehicle is provided in which an uncooling region in a refrigeration trailer is set by placing one or more space-occupying units, having an adjustable inner space, in the refrigeration trailer.

The space-occupying units may include spatial partition structures disposed at a ceiling of the refrigeration trailer and having an expandable inner space, and the uncooling region may be set by adjusting the inner space of the selected spatial partition structures.

The spatial partition structures may be normally contracted, and the uncooling region may be set by expanding the selected spatial partition structures.

The spatial partition structures may have side surfaces formed of a corrugated wall to be folded or unfolded.

Each of the spatial partition structures may be provided at an upper portion thereof with an inner pulley, a wire passing over the inner pulley may be secured at one end thereof to a lower wall of the spatial partition structure and at the other end thereof to a control key via an outer pulley outside the spatial partition structure such that tension of the wire may be controlled through the control key to adjust volume of the spatial partition structure.

Advantageous Effects

According to the invention, a loading space in a refrigeration trailer of a refrigerator vehicle can be varied depending upon volume of loads, thereby reducing fuel and oil costs for cool-air supply and preventing overload of the refrigeration system.

In addition, a loading space can be rapidly varied only through simple operator manipulation such that separate labor is not required for loading or variation in loading space, thereby reducing entire workforce and costs.

Further, the refrigeration system having a variable loading space according to the present invention can be installed and operated without loss of a loading space due to small volume thereof in the trailer.

BEST MODE

Figure 1:
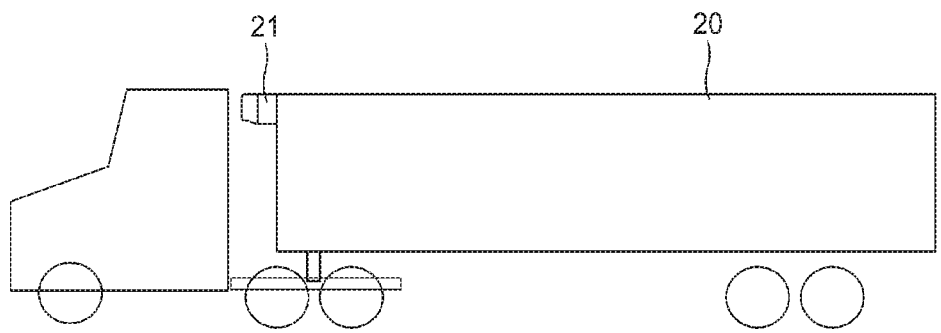
FIG. 1 is a view of a typical refrigeration trailer.
Figure 2:
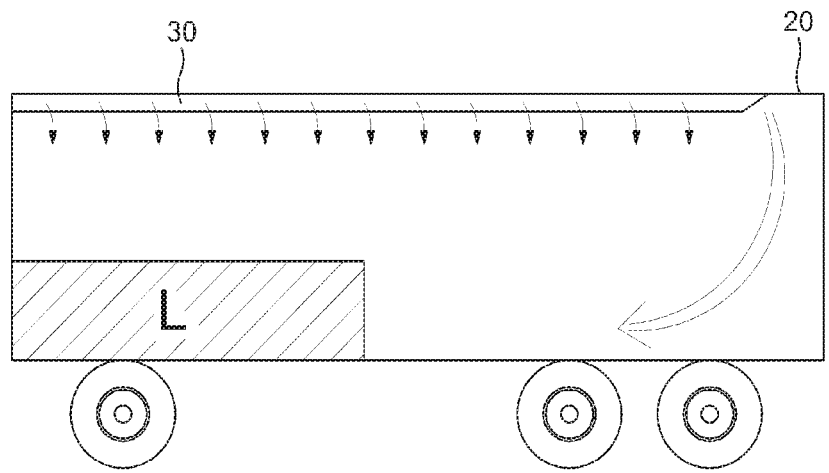
FIG. 2 is a view showing an unreasonable cooling method for the typical refrigeration trailer.

Hereinafter, exemplary embodiments of the invention will be described in detail with reference to the accompanying drawings. It should be noted that like reference numerals denote like elements or components having the same or similar functions in the drawings. In the description of the present invention, detailed descriptions related to well-known functions or configurations will be omitted when they may unnecessarily obscure subject matters of the present invention.

Figure 3:
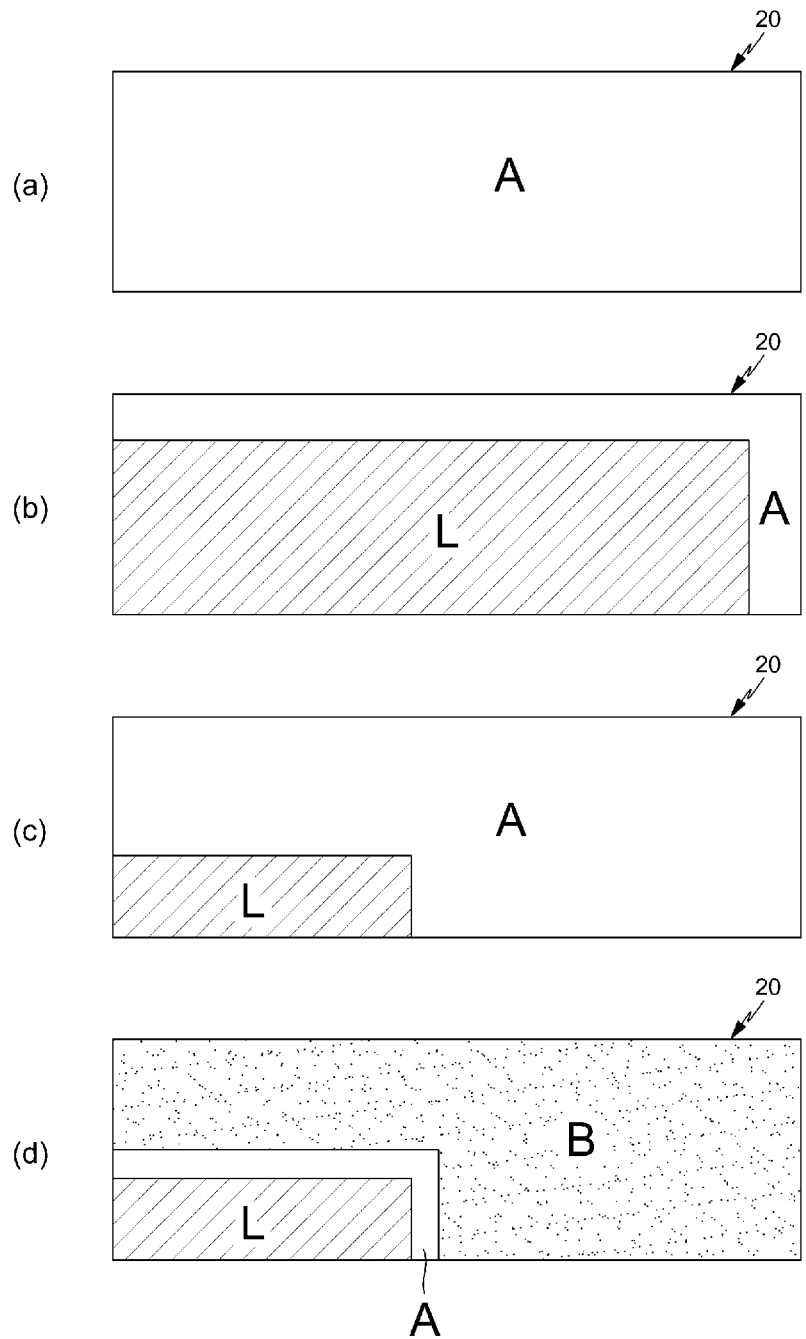
FIG. 3 is a view of a loading space variable refrigeration system of a refrigerator vehicle according to the present invention.

FIG. 3 is a view of a loading space variable refrigeration system of a refrigerator vehicle according to the present invention.

As shown in FIG. 3($a$), a refrigeration trailer 20 having an enclosure shape is provided at a loading station of a refrigerator vehicle carrying various types of frozen or low-temperature foods/goods that cannot be stored or carried at room temperature. The refrigerator vehicle is provided with a refrigerator at a head side thereof or at one upper side of the refrigeration trailer, and the inside of the refrigeration trailer is maintained at a low temperature by an evaporator of the refrigerator. In this case, cool air is discharged into the refrigeration trailer 20 by an exhaust fan.

Therefore, the entire inner space of the refrigeration trailer is a cooling space (A) in which refrigeration is performed.

Loads, such as frozen or low-temperature foods, are loaded in the refrigeration trailer 20. Depending upon circumstances, the refrigeration trailer 20 may be filled up with loads (L) as shown in FIG. 3(b) or partially filled with loads (L) as shown in FIG. 3(c).

When the refrigeration trailer 20 is filled with the loads (L) as shown in FIG. 3(b), the cooling space (A) within the refrigeration trailer 20 is the same as the volume of the loads (L), and therefore there are no serious problems. In contrast, when the refrigeration trailer 20 is partially filled with the loads (L) as shown in FIG. 3(c), there is a large difference between the cooling space (A) within the refrigeration trailer 20 and the volume of the loads (L), thereby causing a variety of problems.

The refrigeration system for the refrigeration trailer 20 supplies cool air into the refrigeration trailer 20 to maintain the entire inner space thereof at a predetermined temperature regardless of the quantity and volume of the loads (L). Therefore, even when loads (L) are small in quantity and volume, the refrigeration system cools the entire inner space of the refrigeration trailer 20, namely, the cooling space (A), thus causing increase in fuel and oil cost and overload of the refrigeration system.

The present invention has been conceived to solve such problems. In the present invention, a loading space may be varied by reducing the internal cooling space (A) of the refrigeration trailer 20 depending upon circumstances. For example, when loads (L) are small in quantity and volume as shown in FIG. 3(d), an uncooling region (B) is increased, and the refrigeration system cools only the reduced cooling space (A).

Hereinafter, various embodiments of the present invention for reducing a cooling space (A) by increasing an uncooling region (B) will be described with reference to the accompanying drawings.

The uncooling region (B) may be set by a horizontal bulkhead moving in an upper space of the refrigeration trailer 20 to define an upper space of the uncooling region (B) and a vertical bulkhead moving in a rear space of the refrigeration trailer 20 to define a rear space of the uncooling region (B). The horizontal bulkhead may be constituted by a single or a plurality of horizontal bulkheads parallel to the horizontal section (e.g., the ceiling) of the refrigeration trailer 20 such that a space above loads (L) is defined and blocked. The vertical bulkhead may be constituted by a gate parallel to the vertical section of the refrigeration trailer 20 (e.g., an opening/closing door of the refrigeration trailer) such that a space behind the loads (L) is defined and blocked. Specific examples of setting the uncooling region (B) will be described below in detail through the following embodiments 1 to 3.

That is, the horizontal bulkhead is moved upwards and downwards within the refrigeration trailer 20 to set a lower cooling space (A) to which cool air is transferred and an upper uncooling region (B) to which cool air is not transferred.

The vertical bulkhead is moved forwards and rearwards within the refrigeration trailer 20 to set a front cooling space (A) to which cool air is transferred and a rear uncooling region (B) to which cool air is not transferred.

In addition, such an uncooling region (B) may also be set by expanding a plurality of balloons disposed on wall faces of the refrigeration trailer 20. Specific examples of setting the uncooling region (B) in such a manner will be described in detail in a fourth embodiment of the present invention.

Embodiment 1

Figure 4:
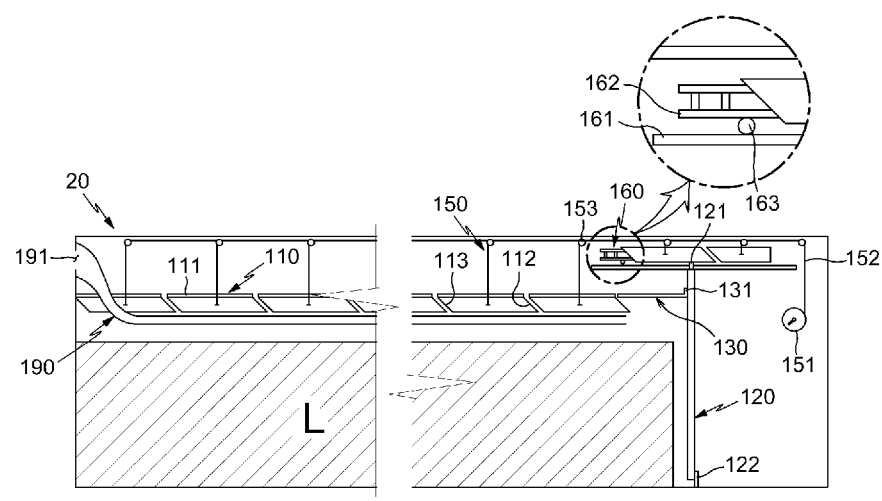
FIG. 4 is a view of a loading space variable refrigeration system of a refrigerator vehicle according to a first embodiment of the present invention.

FIG. 4 is a view of a loading space variable refrigeration system of a refrigerator vehicle according to a first embodiment of the present invention.

In the first embodiment of the present invention, an uncooling region (B) in a refrigeration trailer 20 is set by a plurality of horizontal bulkheads 110 moving upwards and downwards and a vertical bulkhead 120 moving forwards and rearwards and operating as a hinged gate. A connector 130 complements deficiency in length of the lowered horizontal bulkheads 110.

The horizontal bulkheads 110 are arranged parallel to the ceiling of the refrigeration trailer 20 in the horizontal direction. The horizontal bulkheads 110 are selectively moved downwards according to operator manipulation of a hoist, and the height of the uncooling region (B) is determined by a vertical distance by which the horizontal bulkheads 110 move downwards.

More specifically, the horizontal bulkheads 110 are plate-shaped structures formed of a material to block air flow. Each of the horizontal bulkheads 110 is provided on the upper surface thereof with an insertion portion 111 into which one portion of the connector 130 may be inserted. In addition, the horizontal bulkhead 110 has inclined front and rear sides. As shown in FIG. 4, the front side of the horizontal bulkhead 110 (a tractor side of a refrigerator vehicle, more specifically, a cool-air supply side through which cool air is discharged) is formed as an inclined support surface 112 supporting another horizontal bulkhead 110 opposite thereto, and the rear side of the horizontal bulkhead 110 is formed as an inclined coupling surface 113 supported by another horizontal bulkhead 110 opposite thereto. Therefore, thank to the inclined assembly structure of the horizontal bulkhead 110, the preceding horizontal bulkhead 110 can be moved downwards before the following horizontal bulkhead 110, thereby preventing the following horizontal bulkhead 110 from moving downwards before the preceding horizontal bulkhead 110. Further, stopping pieces 114 are formed on surfaces of the horizontal bulkhead 110 facing side surfaces of the refrigeration trailer 20.

The horizontal bulkheads 110 are selectively moved upwards or downwards by the hoist 150. The hoist 150 includes a control key 151 controlled by an operator, a plurality of wires 152 wound or unwound by rotation of the control key 151, and pulleys 153 disposed above the horizontal bulkheads 110 such that the wires 152 are wound therearound, respectively. Each of the wires 152 passing over the pulley 153 is secured at a distal end thereof to the horizontal bulkhead 110.

Accordingly, when an operator unwinds the wires 152 by rotating the control key 151, the corresponding horizontal bulkhead 110 connected to the wires 152 is moved downwards. In order to selectively move the horizontal bulkheads 110 downwards, stoppers 155, a position of which may be changed, are provided on the side surfaces of the refrigeration trailer 20 facing the stopping pieces 114 of the horizontal bulkheads 110. An operator may switch the stoppers 155 to a lock position against the specific horizontal bulkhead 110 such that the stopping pieces 114 of the horizontal bulkhead 110 are stopped by the stoppers 155, thereby preventing the horizontal bulkhead from moving downwards. In contrast, the operator may switch the stoppers 155 to an unlock position for the specific horizontal bulkhead 110 to prevent the stopping pieces 114 of the horizontal bulkhead 110 from being stopped by the stoppers 155, thereby allowing the horizontal bulkhead to move downwards. The control key 151 allows the horizontal bulkhead 110 to move upwards or downwards by controlling the length of the wires 152. Details of this process will be understood through the following description.

Cool air is supplied to the trailer 20 through a cool-air supply hole 191 provided at a front end thereof and transferred to an inner space of the trailer 20 through a duct 190 provided on lower surfaces of the horizontal bulkheads 110. A front end portion of the duct 190 may be formed of an extensible flexible material (e.g., a fabric) or a bellows tube not to be affected by upward and downward movement of the horizontal bulkheads 110. The duct 190 is secured to the lower surfaces of the horizontal bulkheads 110. The duct 190 may be divided into a plurality of parts, and the parts of the duct may be separated from one another when the horizontal bulkheads 110 are moved downwards and upwards. In this case, among the plural duct parts, the rearmost duct part discharges cool air. In another example, the duct 190 may be open at some portions of left and right sides thereof and at a distal end thereof. Some cool air is supplied to loads (L) through the left and right openings, and the rest is supplied through the distal opening to the inner space of the refrigeration trailer 20 and circulates therein. The duct structure in which a duct is divided into plural parts to correspond to bulkheads may also be applied to this example.

The vertical bulkhead 120 is a plate-shaped structure formed of a material to block air flow. The vertical bulkhead 120 may be rotated by a rotating shaft 121 secured to an upper inner surface of the trailer 20. The vertical bulkhead 120 normally makes surface-to-surface contact with the inner surface of the trailer 20 and in setting the uncooling region (B), is rotated about the rotating shaft 121 and arranged parallel to a gate of the trailer 20.

The number of vertical bulkheads 120 may vary with the vertical cross-sectional area of the trailer 20. For example, when the trailer 20 has a small vertical cross-sectional area, one vertical bulkhead 20 having a vertical cross-sectional area corresponding to that of the trailer 20 may be opened and closed by a single rotating shaft 121 provided at one side surface of the trailer 20. In contrast, when the trailer 20 has a large vertical cross-sectional area, two vertical bulkheads 20 having a vertical cross-sectional area corresponding to half that of the trailer 20 may be opened and closed by two rotating shafts 121 provided at both side surfaces of the trailer 20. That is, the vertical bulkheads 120 are hinged gates opened and closed by the rotating shafts 121.

An air blocking section 122 may be attached to a lower portion of the vertical bulkheads 120. The bottom surface of the trailer 20 has a concave-convex pattern such that air circulates therethrough. Therefore, the vertical bulkheads 120 are to be formed at the lower portion thereof with the air blocking section 122 to prevent cool air from being discharged through the concave-convex pattern. The air blocking section 122 may have a concave-convex pattern corresponding to that of the bottom surface of the trailer 20 and be formed of a flexible material (e.g., sponge) not to disturb rotary motion of the vertical bulkheads 120.

The vertical bulkheads 120 are transferred forwards and rearwards by a transfer apparatus 160. The transfer apparatus 160 includes rails 161 secured to the lower surfaces of the horizontal bulkheads 110, a movable guide 162 moving forwards and rearwards along the rails 161, and wires 164 attached to the movable guide 162. The rotating shafts 121 supporting the vertical bulkheads 120 are connected at an upper end thereof to the movable guide 162 to move forwards and rearwards.

The movable guide 162 is placed on rollers 163 and smoothly slides along the rails 161.

Therefore, the vertical bulkheads 120 are moved along the rails 161 and then closed. As a result, the range of the uncooling region (B) is determined by a moving distance of the vertical bulkheads 120.

The horizontal bulkheads 110 have a predetermined length, and therefore an auxiliary upper closing member is required to freely set the desired cooling space (A). To this end, the refrigeration system according to the first embodiment of the present invention includes the connector 130.

The connector 130 is a plate-shaped structure formed of a material to block air flow. The connector 130 is suspended from the movable guide 162 of the transfer apparatus 160 by the wires 164 while being parallel to the ceiling of the refrigeration trailer 20. More specifically, for convenience of coupling to the horizontal bulkhead 110 after movement, the connector 130 is suspended from the movable guide 162 by the wires 164 while being inserted into a casing 132. The connector 130 is moved downwards according to movement of the movable guide 162 and operator manipulation of the wires 164 and then, is inserted into the insertion portion 111 of the rearmost horizontal bulkhead 110, thereby subsidiarily determining the height of the uncooling region (B).

Operation of the loading space variable refrigeration system of a refrigerator vehicle according to the first embodiment of the present invention having the structure as described above will be specifically described below with reference to FIG. 5 briefly showing the overall operation and FIGS. 6 to 16 showing detailed operation.

Figure 5:
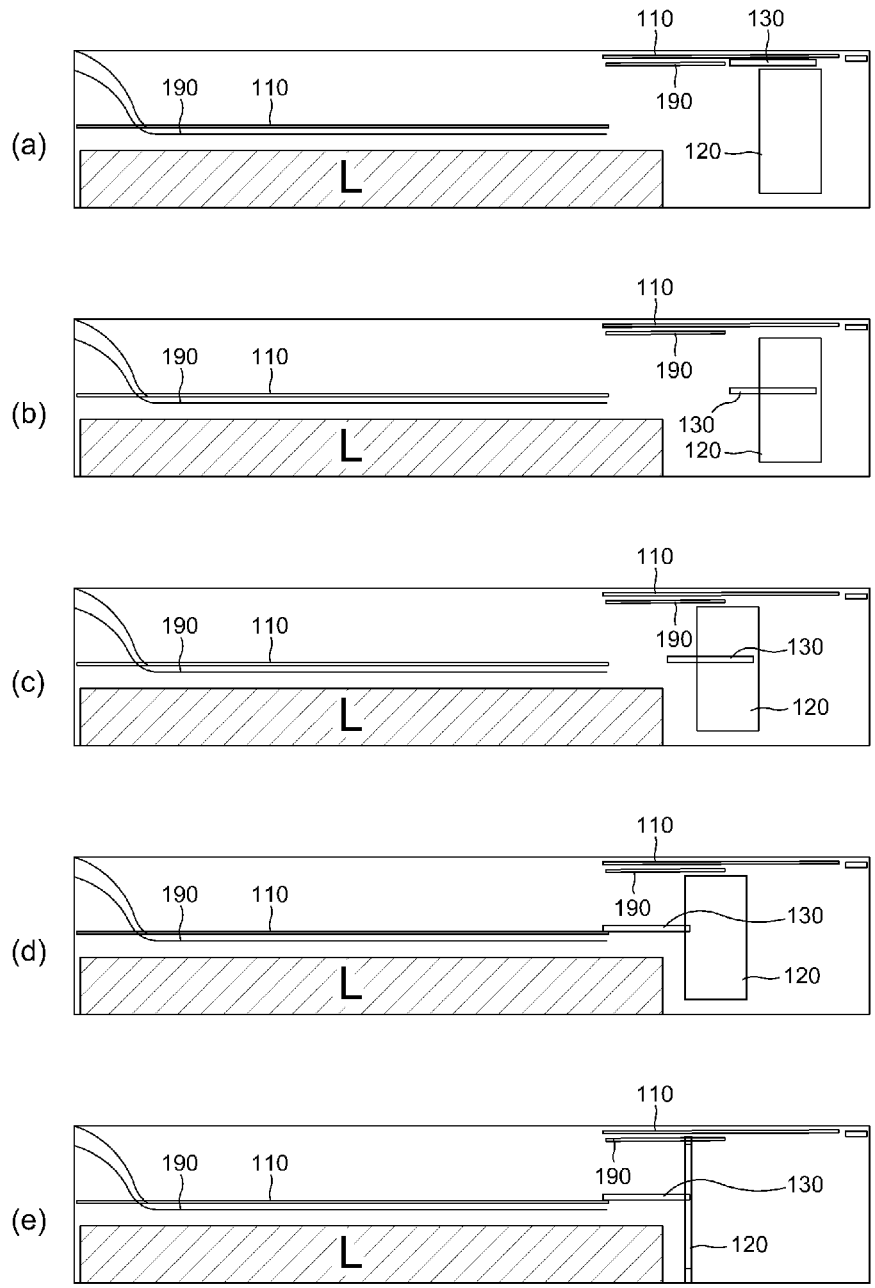
FIG. 5 is a view schematically showing overall operation of the loading space variable refrigeration system of a refrigerator vehicle according to the first embodiment of the present invention.

FIG. 5 is a view schematically showing overall operation of the loading space variable refrigeration system of a refrigerator vehicle according to the first embodiment of the present invention.

Referring to FIG. 5, among the plural horizontal bulkheads 110, the horizontal bulkheads 110 above loads (L) are selected and moved downwards to the height of the loads (L) to set an uncooling region (B) above the loads (L) (See FIG. 5(a)). The connector 130 is moved downwards to the height of the lowered horizontal bulkheads 110 (See FIG. 5(b)). The connector 130 and the vertical bulkheads 120 are moved to the distal end of the loads (L) (See FIG. 5(c)). The connector 130 is coupled to the rearmost lowered horizontal bulkhead 110 to completely set the uncooling region (B) above the loads (See FIG. 5(d)). The vertical bulkheads 120 are rotated to set the uncooling region (B) behind the loads (L) (See FIG. 5(e)). The overall operation of varying the loading space is completed.

Figure 6:
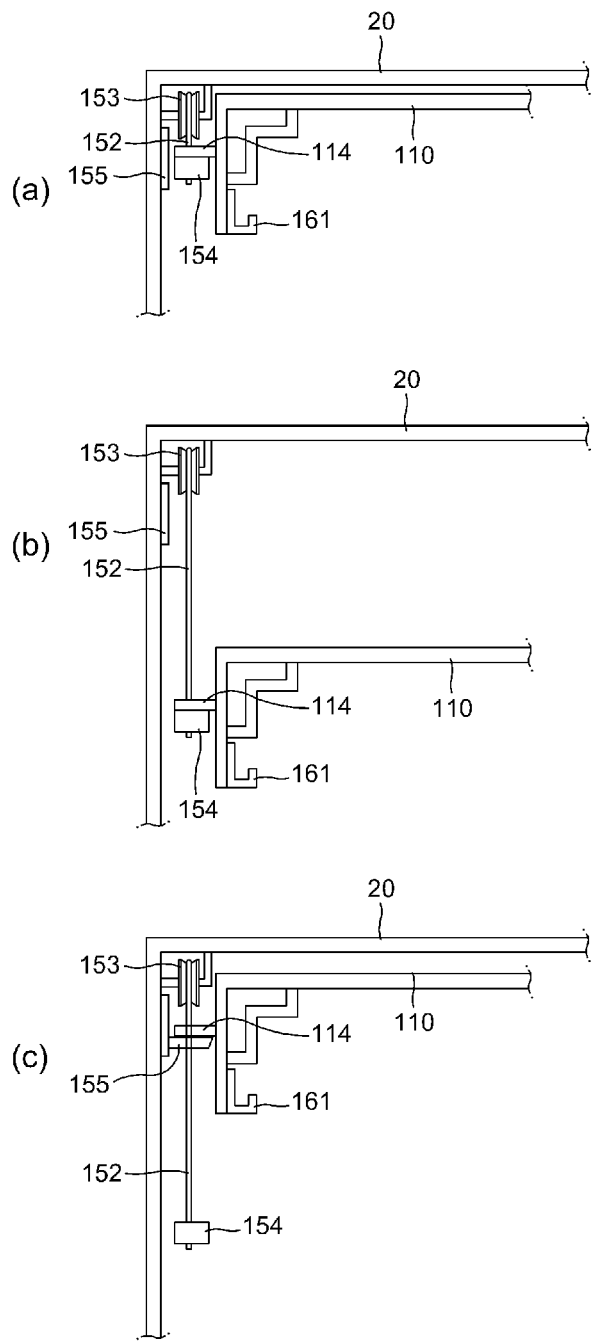
FIGS. 6 to 16 are views showing detailed operation of the loading space variable refrigeration system of a refrigerator vehicle according to the first embodiment of the present invention.

FIG. 6 is a view showing an operation of moving the horizontal bulkheads 110 downwards in the loading space variable refrigeration system of a refrigerator vehicle according to the first embodiment of the present invention.

FIG. 6(a) shows the horizontal bulkheads 110 in a standby state. The horizontal bulkheads 110 are positioned near the ceiling of the refrigeration trailer 20.

FIG. 6(b) shows the horizontal bulkhead 110 moving downwards among the plural horizontal bulkheads 110. When each of the wires 152 is unwound through operator manipulation of the control key 151, a support 154 connected to the distal end of the wire 152 is moved downwards, and the horizontal bulkhead 110 with the stopping piece 114 placed on the support 154 is moved downwards.

FIG. 6(c) shows the horizontal bulkhead 110 not moving downwards among the plural horizontal bulkheads 110. An operator switches in advance the stopper 155 to a lock position such that the stopping piece 114 is stopped by the stopper 155. As a result, even though the wire 152 is unwound, the corresponding horizontal bulkhead 100 does not move downwards.

Figure 7:
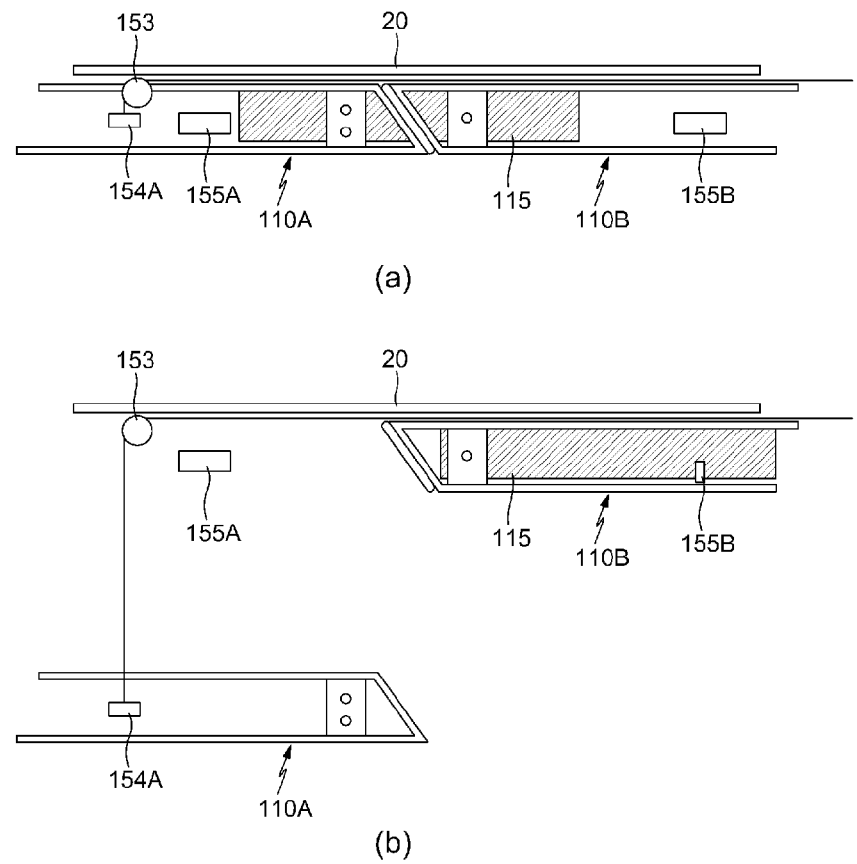

FIG. 7 is a view showing an operation of selectively moving horizontal bulkheads 110A, 110B downwards in the loading space variable refrigeration system of a refrigerator vehicle according to the first embodiment of the present invention.

FIG. 7(a) shows the horizontal bulkheads 110A, 110B in a standby state. The adjacent horizontal bulkheads 110A, 110B are positioned near the ceiling of the refrigeration trailer 20. In this case, the horizontal bulkheads 110A, 110B are coupled to each other through a locking bar 115 inserted thereinto.

FIG. 7(b) shows a state in which the left 110A of the horizontal bulkheads 110A, 110B is moved downwards. An operator unlocks the adjacent horizontal bulkheads 110A, 110B by moving the locking bar 115 rearwards. When the wire 152 is unwound through operator manipulation of the control key 151, the left horizontal bulkhead 110A is moved downwards together with a support 154A at the distal end of the wire 152. In this case, a stopper 155A is switched to an unlock position for the left horizontal bulkhead 110A, and a stopper 155B is switched to a lock position against the right horizontal bulkhead 110B. Therefore, only the left horizontal bulkhead 110A can be selectively moved downwards. The stoppers 155A, 155B may be switched in advance by an operator.

Figure 8:
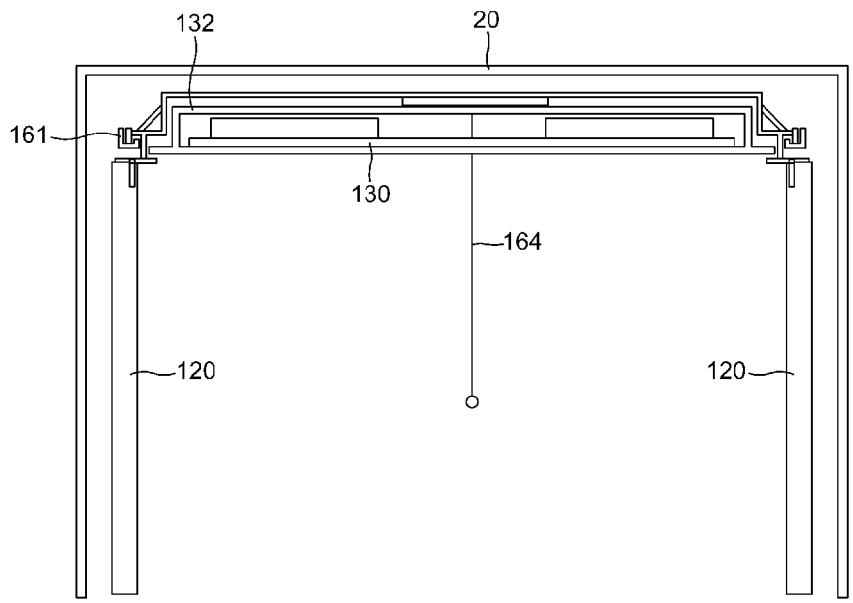

FIG. 8 is a view showing a standby state of the vertical bulkheads 120 and the connector 130 in the loading space variable refrigeration system of a refrigerator vehicle according to the first embodiment of the present invention.

The two vertical bulkheads 120 are normally disposed near both the side surfaces of the refrigeration trailer 20, respectively, and the connector 130 is inserted into the casing 132 secured by the wires 164 to the movable guide (not shown) on the rails 161.

Figure 9:
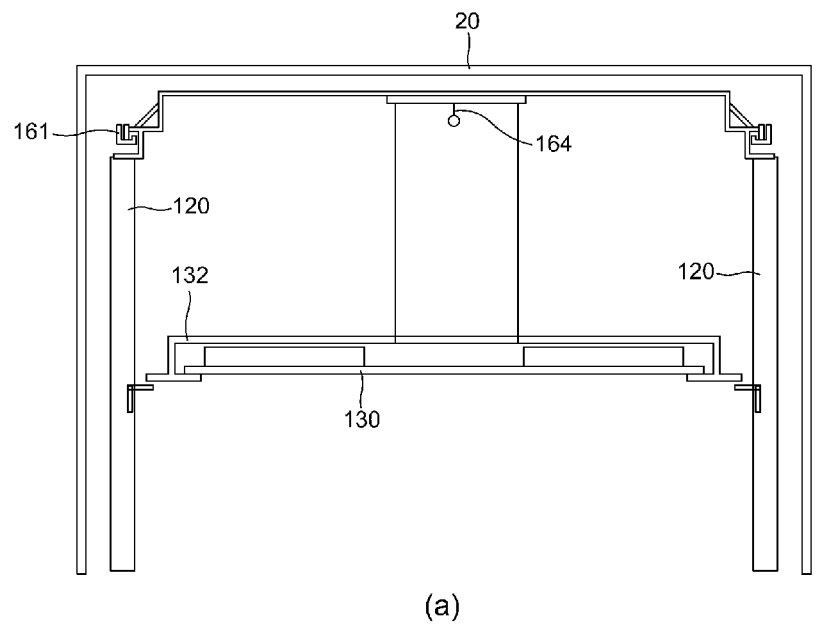
Figure 9:
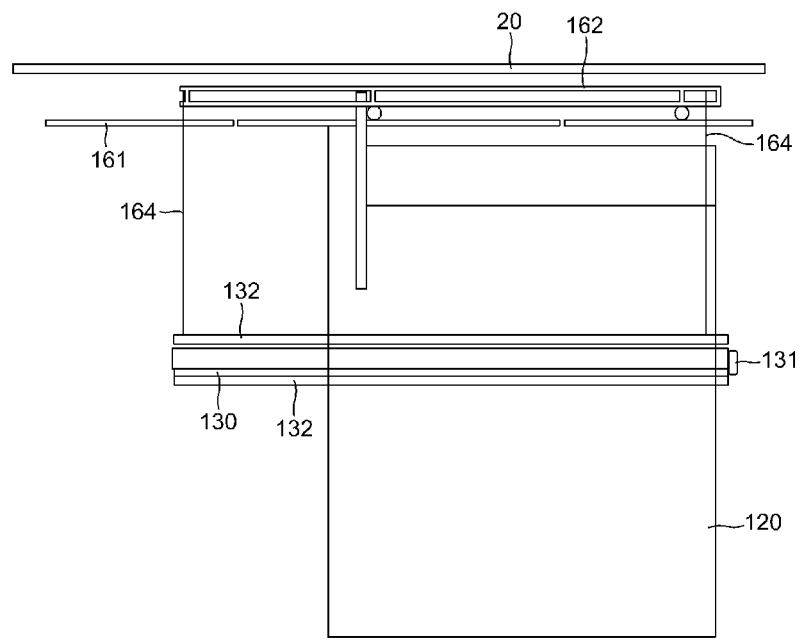

FIG. 9 is a view showing an operation of moving the connector 130 downwards in the loading space variable refrigeration system of a refrigerator vehicle according to the first embodiment of the present invention. FIGS. 9(a) and 9(b) are front and side views showing a state in which the connector 130 is moved downwards.

Referring to FIG. 9, when the wires 164 are unwound by an operator, the casing 132 secured to the movable guide 162 on the rails 161 is slowly is moved downwards. In this case, a vertical distance that the casing 132 moves downwards may be adjusted by the operator depending upon the vertical distance by which the horizontal bulkheads 110 have moved downwards.

Figure 10:
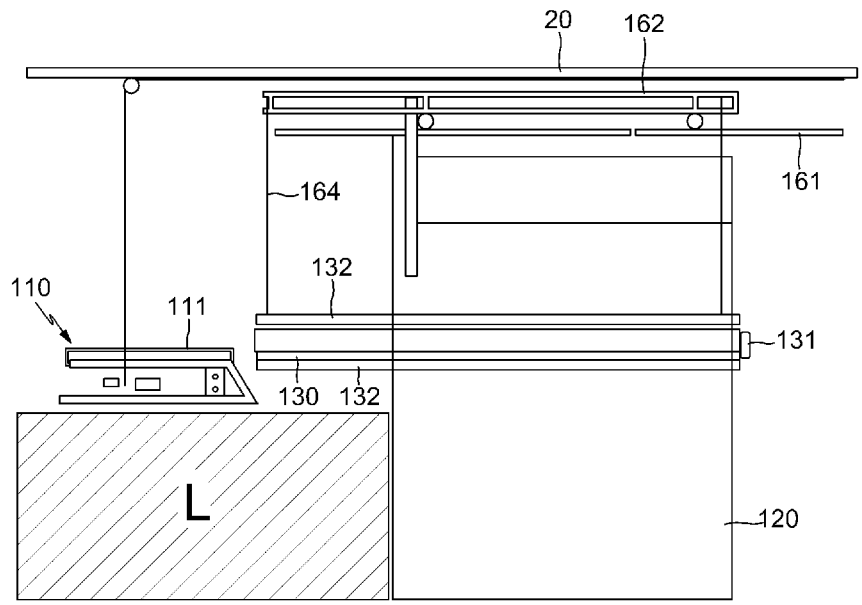
Figure 11:
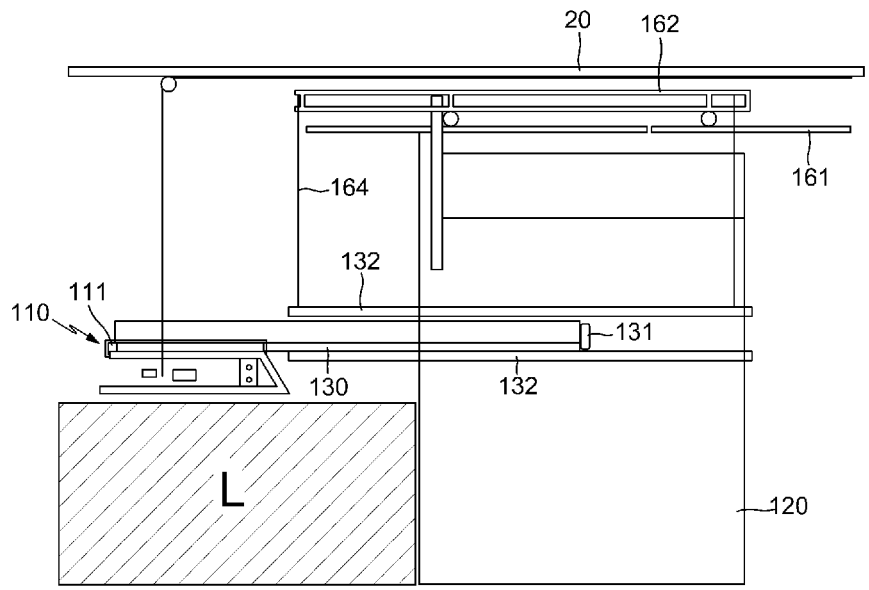
Figure 12:
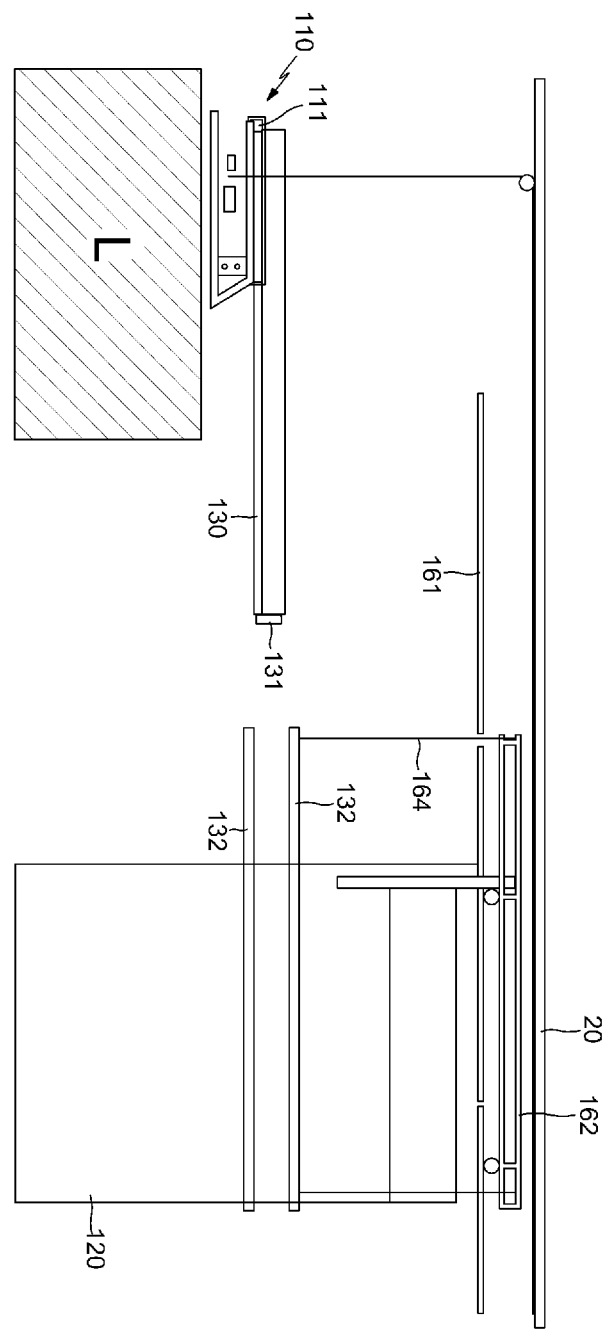

FIGS. 10 to 12 are views showing an operation of coupling the connector 130 to the horizontal bulkhead 110 in the loading space variable refrigeration system of a refrigerator vehicle according to the first embodiment of the present invention.

Referring to FIG. 10, the movable guide 162 supporting the lowered connector 130 is moved forwards along the rails 161, and thus, the casing 132 receiving the connector 130 therein closely approaches the horizontal bulkhead 110.

Referring to FIG. 11, the connector 130 is extracted from the casing 132, and one portion of the connector 130 is inserted into the insertion portion 111 of the horizontal bulkhead 110. As a result, the connector 130 is coupled to the horizontal bulkhead 110.

Referring to FIG. 12, the casing 132 retreats by moving the movable guide 162 rearwards along the rails 161. Thereafter, a space is ensured by moving the casing 132 upwards again.

Figure 13:
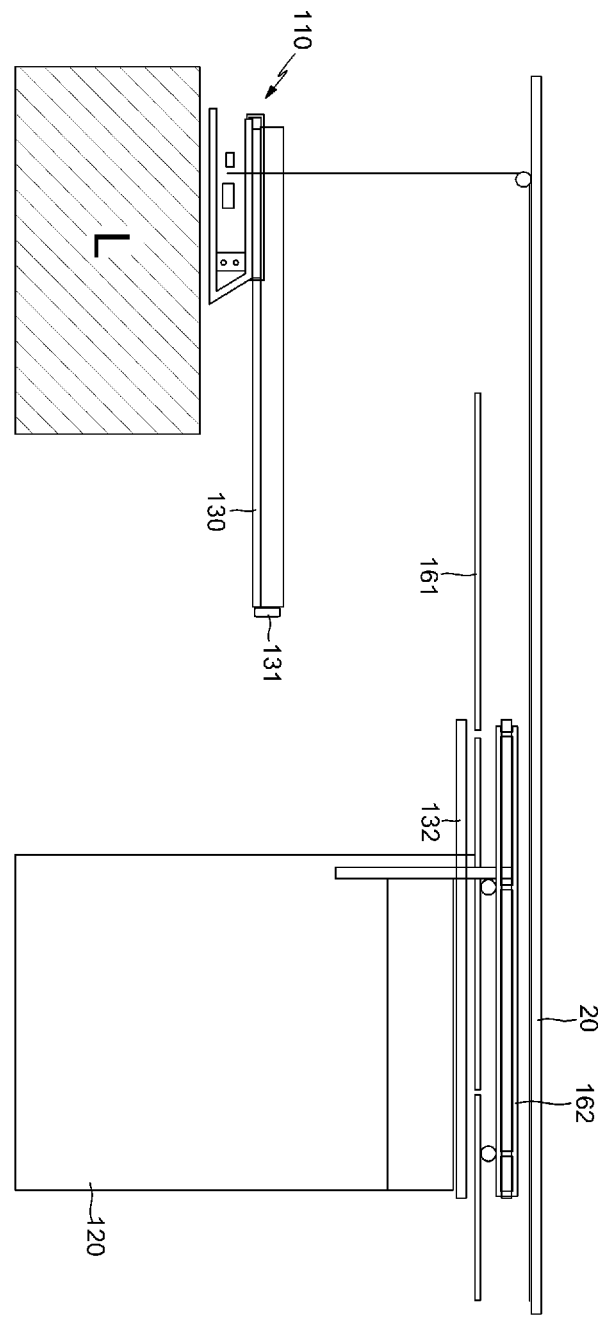
Figure 14:
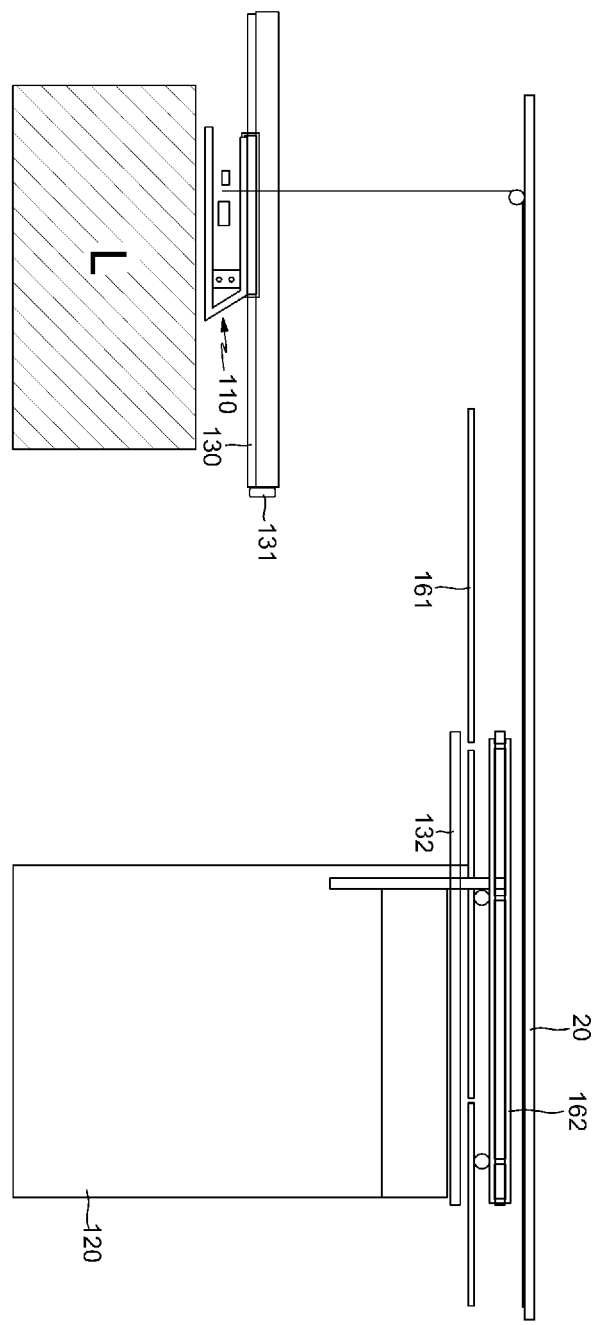

FIGS. 13 and 14 are views showing a post-process after the connector 130 is coupled to the horizontal bulkhead 110 in the loading space variable refrigeration system of a refrigerator vehicle according to the first embodiment of the present invention.

When the connector 130 overhangs the loads (L) as shown in FIG. 13, the connector 130 is pushed to fit the length of the loads (L).

Figure 15:
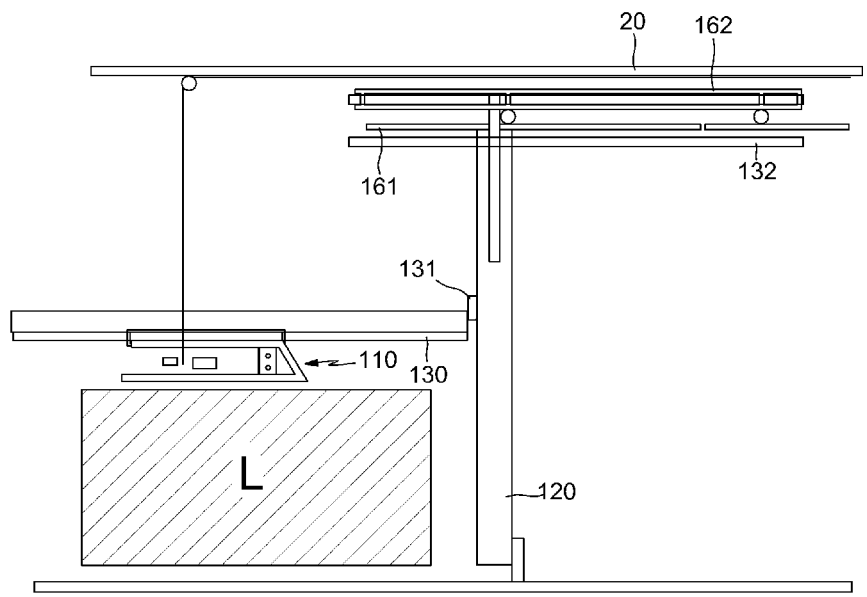

FIG. 15 is a view showing an operation of moving the vertical bulkheads 120 in the loading space variable refrigeration system of a refrigerator vehicle according to the first embodiment of the present invention.

The vertical bulkheads 120 secured to the movable guide 162 are moved to the distal end of the connector 130 according to movement of the movable guide 162 and rotated by the rotating shafts 121 to close the cooling space (A) as shown in FIG. 15.

Reference numeral 131 not described herein denotes an air blocking section for sealing a space between the connector 130 and the vertical bulkheads 120.

Figure 16:
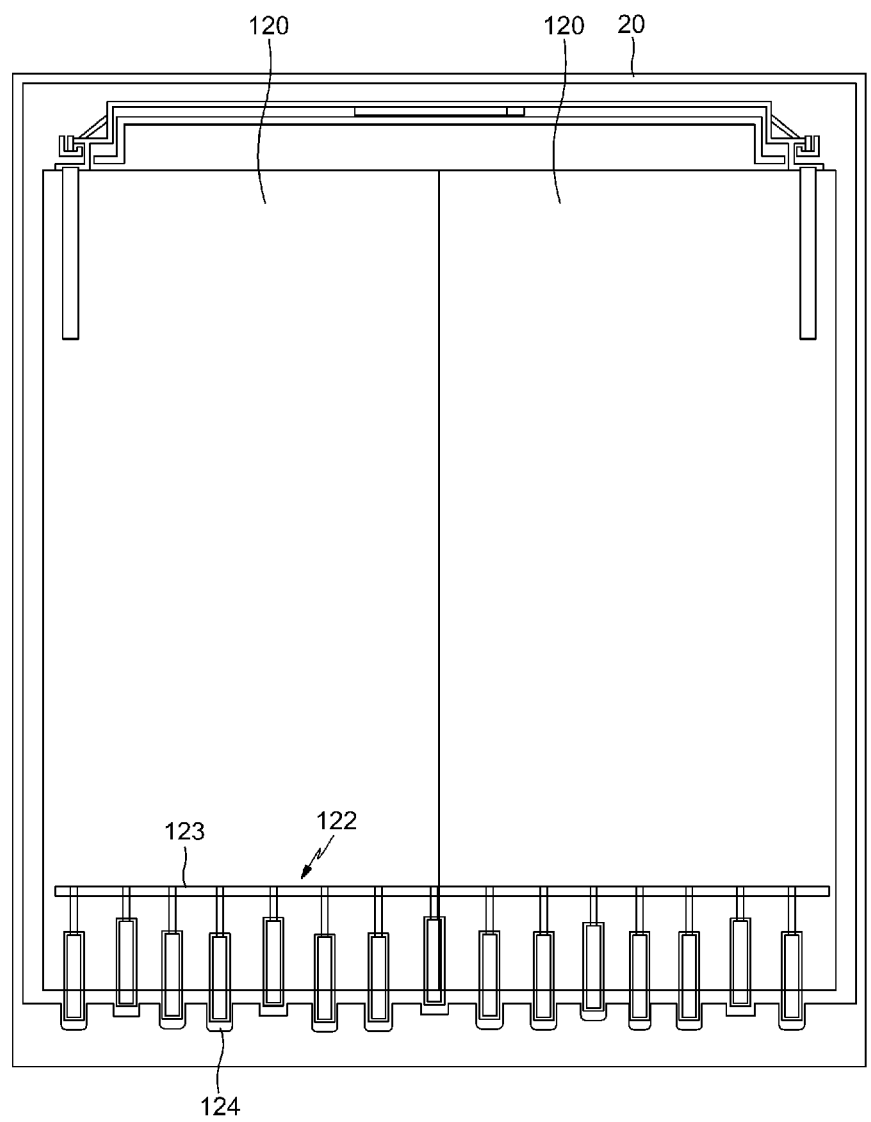

FIG. 16 is a view showing an operation of sealing the bottom of the vertical bulkheads 120 in the loading space variable refrigeration system of a refrigerator vehicle according to the first embodiment of the present invention.

As described above, the bottom surface of the trailer 20 has a concave-convex pattern such that air circulates therethrough. Therefore, the vertical bulkheads 120 are to be formed at the lower portion thereof with the air blocking section 122 to prevent cool air from being discharged therethrough. The air blocking section 122 includes seal brushes 124 arranged in a concave-convex pattern to correspond to the concave-convex pattern of the bottom surface of the trailer 20 and a rotating rod 123 for rotating the seal brushes 124. When rotated upwards about the rotating rod 123 and secured, the seal brushes 124 do not affect movement of the vertical bulkheads 120. In contrast, when rotated downwards about the rotating rod 123 and secured, the seal brushes 124 are inserted into depressions of the concave-convex pattern formed on the bottom surface of the trailer 20 to prevent cool air from being exhausted from the cooling space (A). The seal brushes may be formed of a flexible material (e.g., sponge).

Embodiment 2

Figure 17:
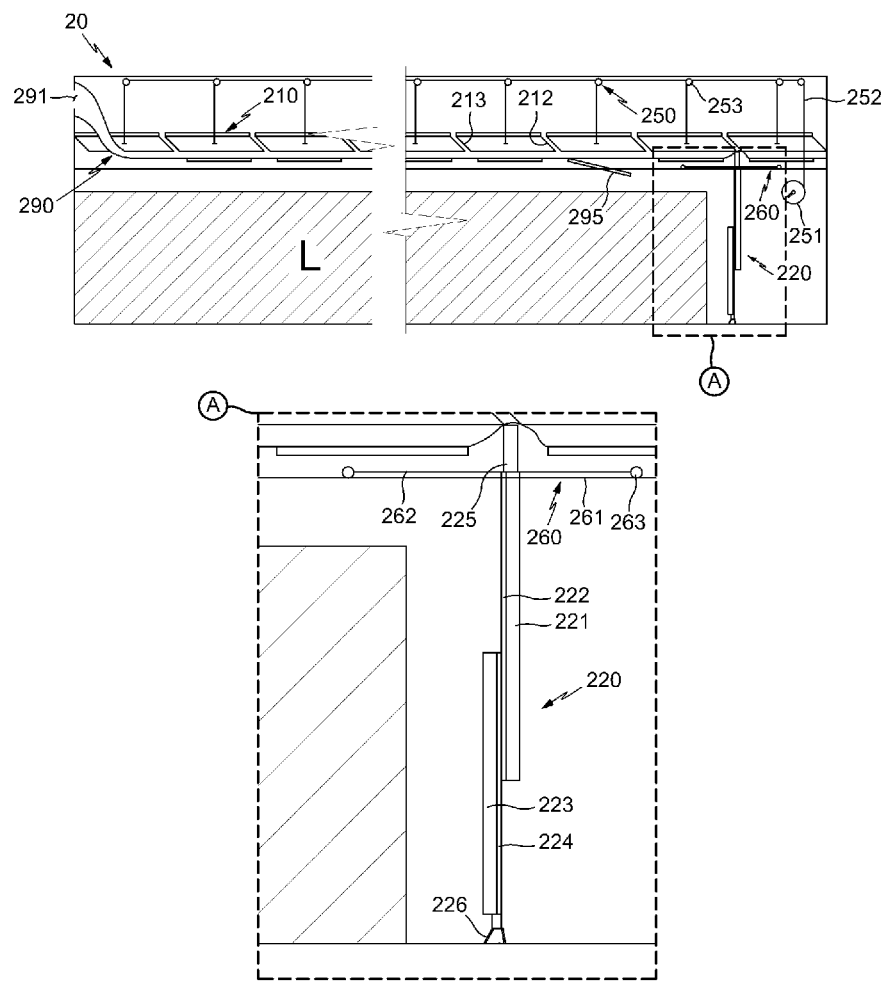
FIG. 17 is a view of a loading space variable refrigeration system of a refrigerator vehicle according to a second embodiment of the present invention.

FIG. 17 is a view of a loading space variable refrigeration system of a refrigerator vehicle according to a second embodiment of the present invention.

In the second embodiment of the present invention, an uncooling region (B) in a refrigeration trailer 20 is set by a single or a plurality of horizontal bulkheads 210 moving upwards and downwards and a vertical bulkhead 220 moving forwards and rearwards and operating as a sliding gate in which a lower wall is engaged with an upper wall and slides thereon.

The second embodiment is different from the first embodiment in that the connector 130 is not necessary.

In description of the second embodiment, repetitious description of components having the same configuration as in the first embodiment will be omitted, and the following description focuses on the differences from the first embodiment.

The horizontal bulkheads 210 in the second embodiment have a configuration similar to the horizontal bulkheads 110 in the first embodiment. However, in the first embodiment, only some of the horizontal bulkheads 110 are moved downwards to set the uncooling region (B), whereas in the second embodiment, all the horizontal bulkheads 210 may be are moved downwards to set the uncooling region (B). Therefore, in the second embodiment, a single horizontal bulkhead may also be provided to cover a horizontal space in the refrigeration trailer 20, instead of the plural horizontal bulkheads 210.

Cool air is supplied to the refrigeration trailer 20 through a cool-air supply hole 291 provided at a front end thereof and transferred to an inner space of the refrigeration trailer 20 through a duct 290. The duct 290 has a structure in which a main air passage 292 is formed in a longitudinal direction of the refrigeration trailer 20, and auxiliary air passages 293, 294 are formed at left and right sides of the main air passage 292. The main air passage 292 is used to discharge cool air to a rear end portion of the refrigeration trailer 20, and the auxiliary air passages 293, 294 are used to partially supply the cool air to a lower space of the refrigeration trailer 20 by discharging the cool air through through-holes 296 formed on side surfaces thereof. Particularly, in this embodiment, the main air passage 292 of the duct 290 may be divided into a plurality of parts in the longitudinal direction of the refrigeration trailer 20, each of which has an opening/closing door 295. Therefore, when an operator opens the opening/closing door 295 of a specific part, the cool air supplied through the cool-air supply hole 291 at the front end of the trailer 20 is discharged from the corresponding position through the opening/closing door 295 to the inner space of the refrigeration trailer 20. The duct 290 will be described below in detail with reference to the related drawings.

The vertical bulkhead 220 is a structure in which a lower sliding plate 223 is engaged with an upper sliding plate 221 and slides thereon, and the upper and lower sliding plates 221, 223 are made of a material to block air flow. More specifically, the upper and lower sliding plates 221, 223 are coupled while facing each other, and the lower sliding plate 223 slides on the upper sliding plate 221. A transfer apparatus 260 is provided on the lower surface of the horizontal bulkhead 210 to move the vertical bulkhead 220 forwards and rearwards. The vertical bulkhead 220 stands by while making surface-to-surface contact with the lower surface of the horizontal bulkhead 210 and is moved forwards by the transfer apparatus 260, with the upper and lower sliding plates 221, 223 superposed on each other. Thereafter, the vertical bulkhead 220 rotates to a vertical position and sets the uncooling region (B), with the lower sliding plate 223 sliding downwards on the upper sliding plate 221. That is, the vertical bulkhead 220 is a type of sliding gate in which the lower sliding plate 223 is engaged with the upper sliding plate 221 and slides thereon. The upper sliding plate 221 is formed at a distal end thereof with a clamp 225 pressing the main air passage 292 and the auxiliary air passages 293, 294 of the duct 290 when the vertical bulkhead 220 rotates to the vertical position. In addition, the upper sliding plate 221 is formed at both sides thereof with upper foldable seals 222 to prevent cool air from leaking to the uncooling region (B) through both sides thereof. Like the upper sliding plate 221, the lower sliding plate 223 is formed at both sides thereof with lower foldable seals 224 to prevent cool air from leaking to the uncooling region (B) through both sides thereof. In addition, the lower sliding plate 223 is formed at a distal end thereof with an air blocking section 226 to prevent cool air from leaking to the uncooling region (B).

The air blocking section 226 prevents leakage of cool air through a concave-convex pattern at the bottom of the refrigeration trailer 20 as in the first embodiment.

The vertical bulkhead 220 is moved forwards and rearwards by the transfer apparatus 260. The transfer apparatus 260 includes rails 261 secured to the lower surface of the horizontal bulkhead 210, a movable guide 262 moving forwards and rearwards along the rails 261, and a wire 264 attached to the movable guide 262. The upper sliding plate 221 of the vertical bulkhead 220 is rotatably coupled to the movable guide 262.

The movable guide 262 is placed on rollers 263 to smoothly slide along the rails 261.

Therefore, the vertical bulkhead 220 having moved along the rails 261 rotates to a vertical position and then spreads. As a result, the range of the uncooling region (B) is determined by a moving distance of the vertical bulkhead 220.

Operation of the loading space variable refrigeration system of a refrigerator vehicle according to the second embodiment of the present invention having the structure as described above will be specifically described below with reference to FIG. 18 briefly showing overall operation of the refrigeration system and FIGS. 19 to 26 showing detailed operation.

Figure 18:
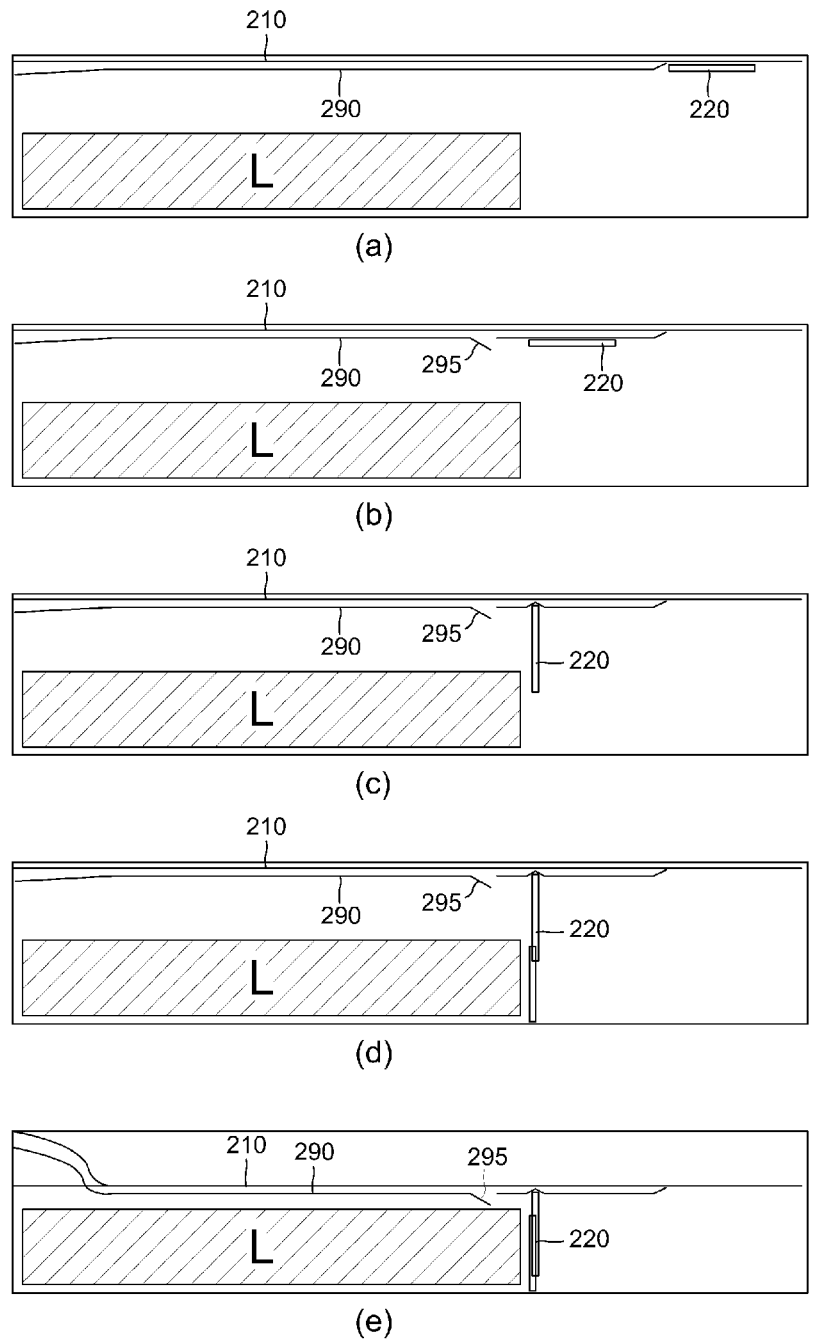
FIG. 18 is a view schematically showing overall operation of the loading space variable refrigeration system of a refrigerator vehicle according to the second embodiment of the present invention.

FIG. 18 is a view schematically showing overall operation of the loading space variable refrigeration system of a refrigerator vehicle according to the second embodiment of the present invention.

Referring to FIG. 18, when loads (L) are loaded in the refrigeration trailer 20 (See FIG. 18(*a*)), the main air passage 292 at the distal end of the loads (L) is open and the vertical bulkhead 220 is moved to the distal end of the loads (L) (See FIG. 18(*b*)). The vertical bulkhead 220 is rotated to a vertical position, and the clamp 225 presses the main air passage 292 and the auxiliary air passages 293, 294 at the distal end of the loads (L) (See FIG. 18(*c*)). The vertical bulkhead 220 extends downwards by sliding the lower sliding plate 223 (See FIG. 18(*d*)). The horizontal bulkheads 210 are moved downwards to the height of the loads (L) (See FIG. 18(*e*)). The overall operation of varying the loading space is completed.

Although the horizontal bulkheads 210 are moved downwards after installation of the vertical bulkhead 220, the horizontal bulkheads 210 may also be moved downwards before installation of the vertical bulkhead 220.

Figure 19:
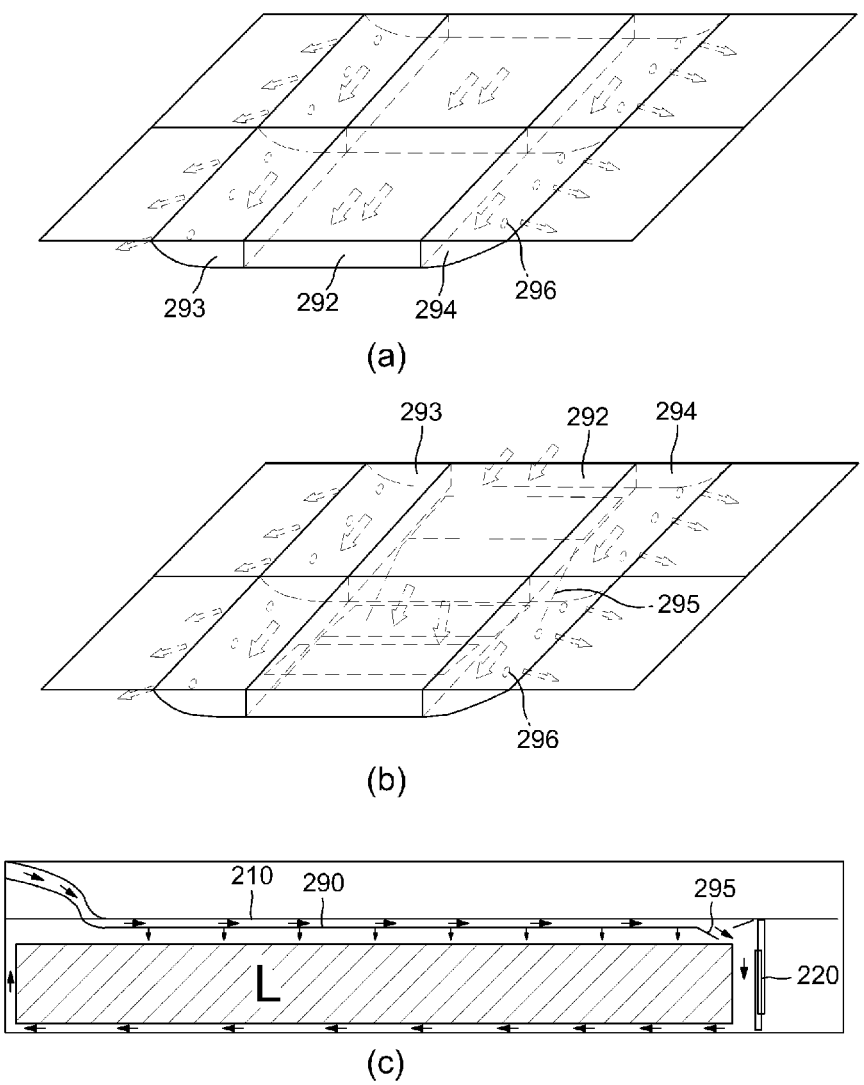
FIGS. 19 to 26 are views showing detailed operation of the loading space variable refrigeration system of a refrigerator vehicle according to the second embodiment of the present invention.

FIG. 19 is a view showing an operation of supplying cool air through the duct 290 in the loading space variable refrigeration system of a refrigerator vehicle according to the second embodiment of the present invention.

FIG. 19(*a*) shows an intermediate portion of the entire duct 290. The duct 290 has a structure in which the main air passage 292 is formed in the longitudinal direction of the refrigeration trailer 20, and the auxiliary air passages 293, 294 are formed at the left and right sides of the main air passage 292. The main air passage 292 is used to discharge cool air to the rear end portion of the refrigeration trailer 20, and the auxiliary air passages 293, 294 are used to partially supply the cool air to the lower space of the refrigeration trailer 20 by discharging the cool air through the plural through-holes 296 formed on the side surfaces thereof.

FIG. 19(*b*) shows a distal end portion of the entire duct 290. In this embodiment, the main air passage 292 of the duct 290 may be divided into a plurality of parts in the longitudinal direction of the refrigeration trailer 20, each of which has the opening/closing door 295. Therefore, when an operator opens the opening/closing door 295 of a specific part, the cool air supplied through the cool-air supply hole 291 at the front end of the trailer 20 is discharged from the corresponding position through the opening/closing door 295 to the inner space of the refrigeration trailer 20.

FIG. 19(c) shows a cool-air supply structure of the entire duct 290. The supplied cool air is transferred to the rear end side of the refrigeration trailer 20 through the main air passage 292 of the duct 290 and at the same time, partially discharged through the auxiliary air passages 293, 294 of the duct 290 in the entire region of the refrigeration trailer 20. In this case, when the opening/closing door 295 at a specific position of the main air passage 292 is open, the cool air is discharged downwards and circulates in the entire space.

Figure 20:
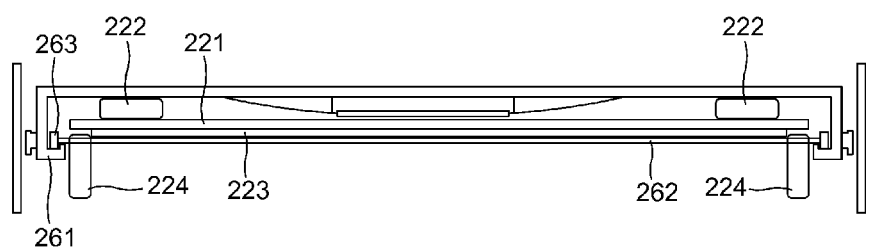
Figure 20:
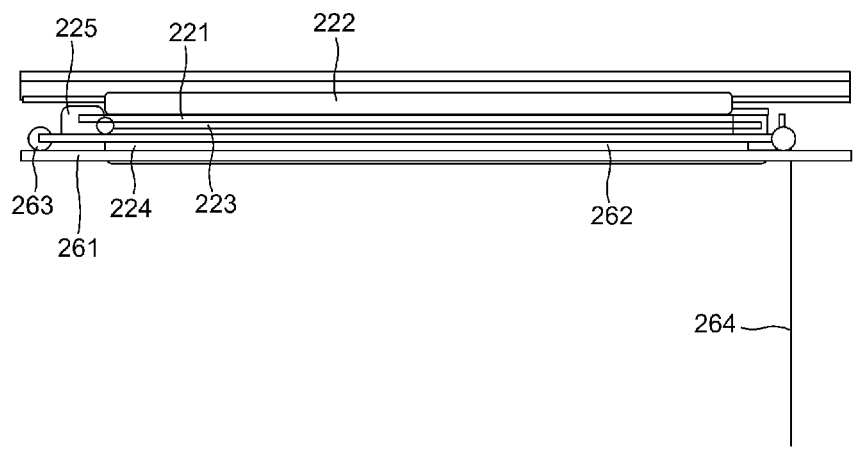

FIG. 20 is a view showing a structure of the vertical bulkhead 220 in the loading space variable refrigeration system of a refrigerator vehicle according to the second embodiment of the present invention.

FIG. 20(a) is a rear view of the vertical bulkhead 220, and FIG. 20(b) is a side view of the vertical bulkhead 220. The vertical bulkhead 220 stands by while making surface-to-surface contact with the lower surface of the horizontal bulkhead 210. As shown in FIG. 20, the upper and lower sliding plates 221, 223 of the vertical bulkhead 220 are superposed on each other. The upper foldable seals 222 at both the sides of the upper sliding plate 221 and the lower foldable seals 224 at both the sides of the lower sliding plate 223 are folded. The upper sliding plate 221 is formed at the distal end thereof with the clamp 225 pressing the main air passage 292 and the auxiliary air passages 293, 294 of the duct 290 when the vertical bulkhead 220 rotates to the vertical position. Here, reference numeral 264 denotes a wire used to move the vertical bulkhead 220.

Figure 21:
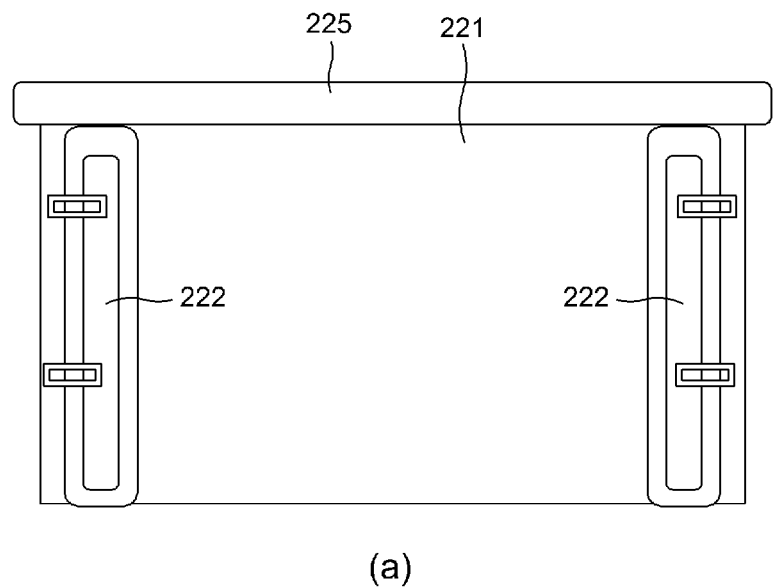
Figure 21:
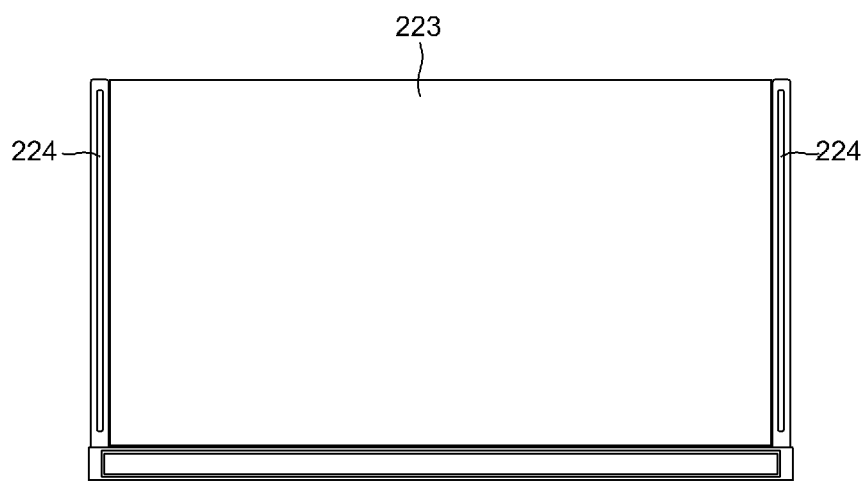

FIG. 21 is a view showing the foldable seals of the vertical bulkhead 220 in the loading space variable refrigeration system of a refrigerator vehicle according to the second embodiment of the present invention.

FIG. 21(a) shows the upper sliding plate 221. The upper sliding plate 221 is formed at both sides thereof with the upper foldable seals 222 to prevent cool air from leaking to the uncooling region (B) through both sides thereof. In addition, the upper sliding plate 221 is formed at the distal end thereof with the clamp 225 pressing the main air passage 292 and the auxiliary air passages 293, 294 of the duct 290 when the vertical bulkhead 220 rotates to the vertical position.

FIG. 21(b) shows the lower sliding plate 221. The lower sliding plate 223 is formed at both sides thereof with the lower foldable seals 224 to prevent cool air from leaking to the uncooling region (B) through both sides thereof.

Figure 22:
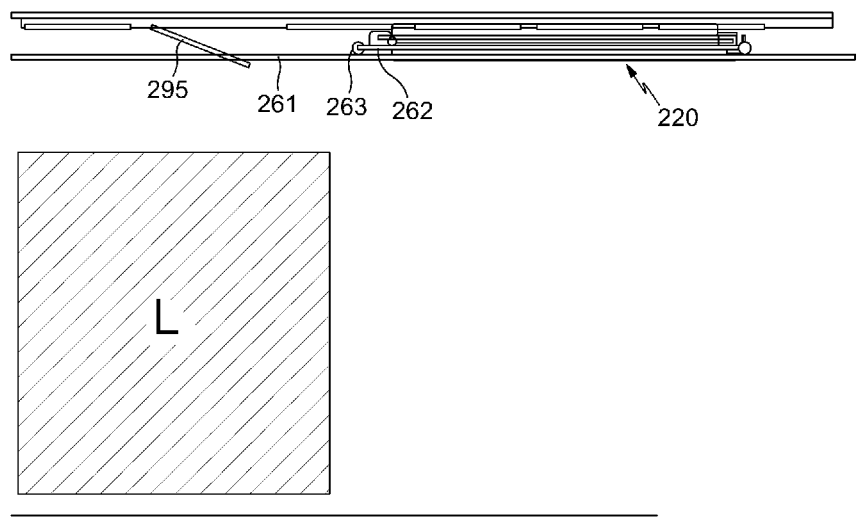

FIG. 22 is a view showing an operation of installing the vertical bulkhead 120 in the loading space variable refrigeration system of a refrigerator vehicle according to the second embodiment of the present invention.

Referring to FIG. 22, the vertical bulkhead 220 is moved to the position of the loads (L) by moving the movable guide 262 supporting the vertical bulkhead 220 along the rails 261, and the opening/closing door 295 of the main air passage 292 above the loads (L) is open.

Figure 23:
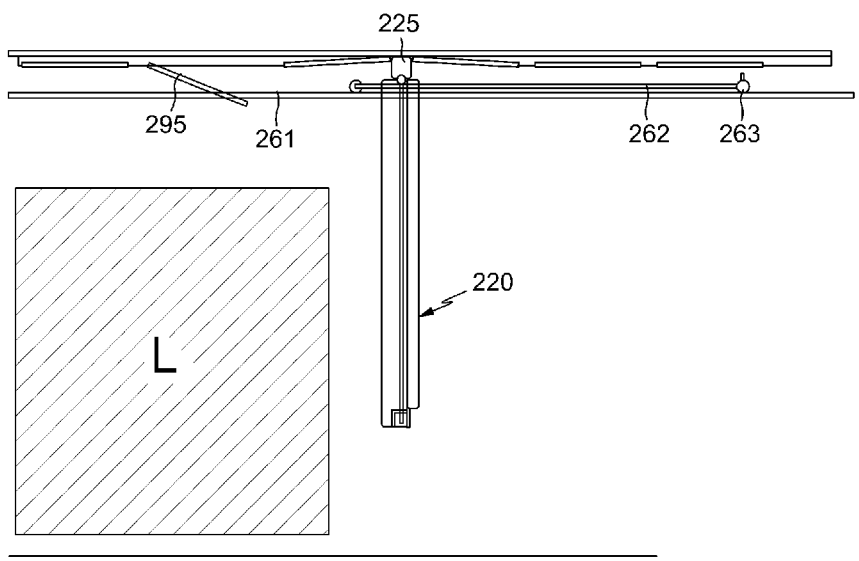

Referring to FIG. 23, the vertical bulkhead 220 is rotated to a vertical position, whereby the clamp 225 of the upper sliding plate 221 presses the main air passage 292 and the auxiliary air passages 293, 294 of the duct 290.

Figure 24:
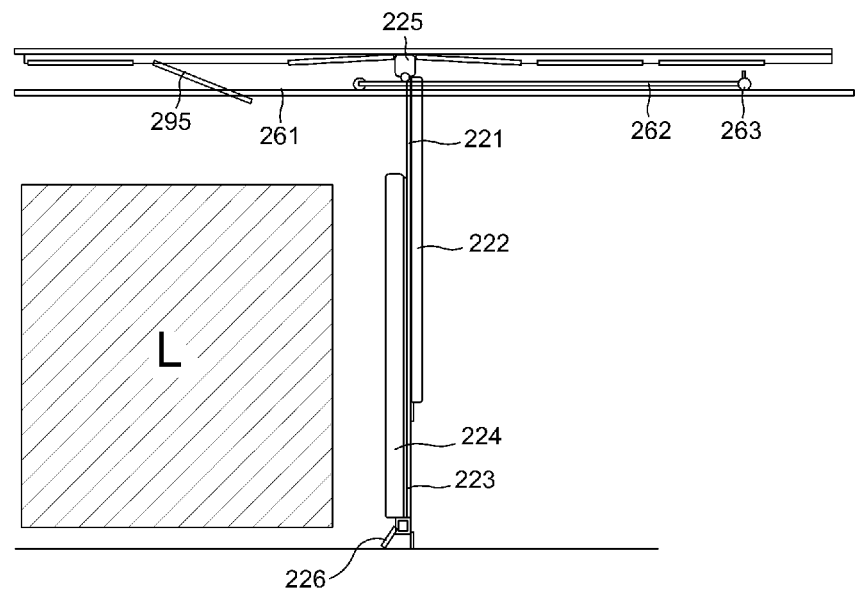

Referring to FIG. 24, the lower sliding plate 223 of the vertical bulkhead 220 is moved downwards, and the air blocking section 226 is secured to the bottom of the refrigeration trailer 20. The air blocking section 226 has the same configuration as that of the first embodiment.

Figure 25:
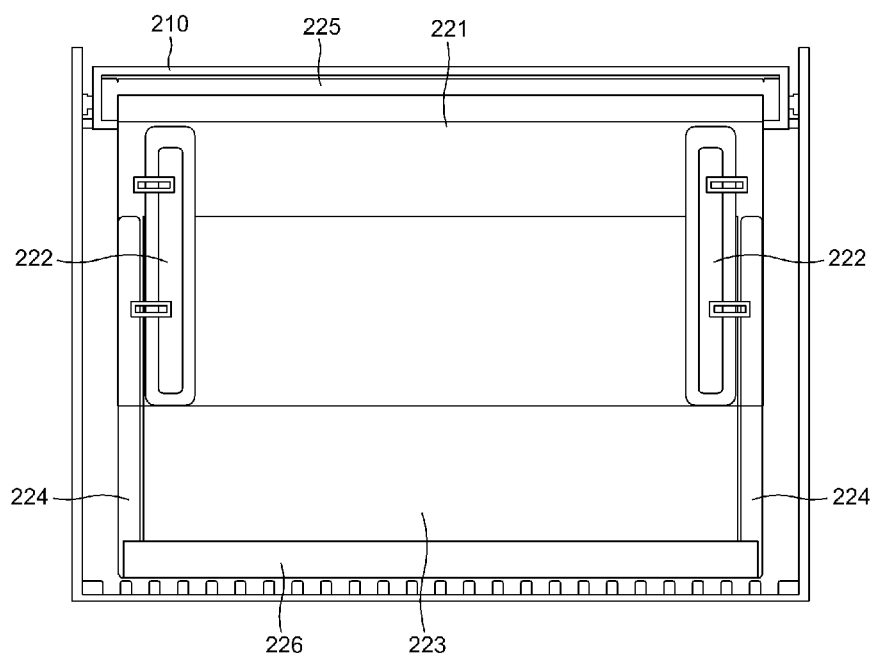
Figure 26:
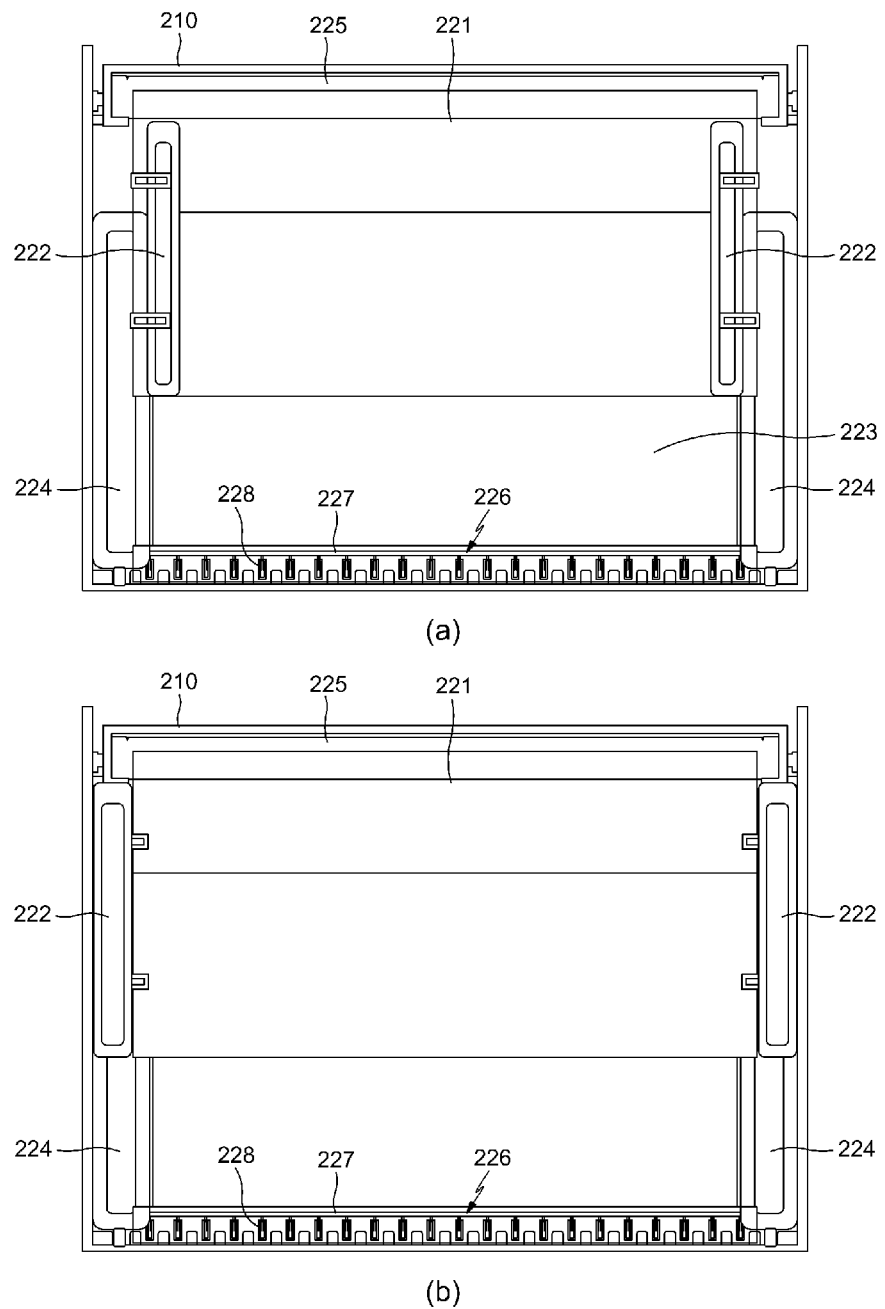

FIGS. 25 and 26 are views showing an operation of preventing leakage of cool air by the vertical bulkhead 220 in the loading space variable refrigeration system of a refrigerator vehicle according to the second embodiment of the present invention.

FIG. 25 is a rear view showing a state in which the vertical bulkhead 220 is rotated to a vertical position.

Referring to FIG. 26(a), the lower foldable seals 224 at both sides of the lower sliding plate 223 are unfolded to contact inner side surfaces of the refrigeration trailer 20, and the air blocking section 226 is provided at the lower end of the lower sliding plate 223 such that seal brushes 228 thereof are inserted into depressions of the concave-convex pattern at the bottom of the trailer 20 to prevent cool air from being exhausted from the cooling space (A).

Referring to FIG. 26(b), after the vertical bulkhead 210 is moved downwards, the upper foldable seals 224 at both sides of the upper sliding plate 223 are unfolded to contact the inner side surfaces of the refrigeration trailer 20, thereby separating the entire cooling space (A) from the uncooling region (B).

Embodiment 3

Figure 27:
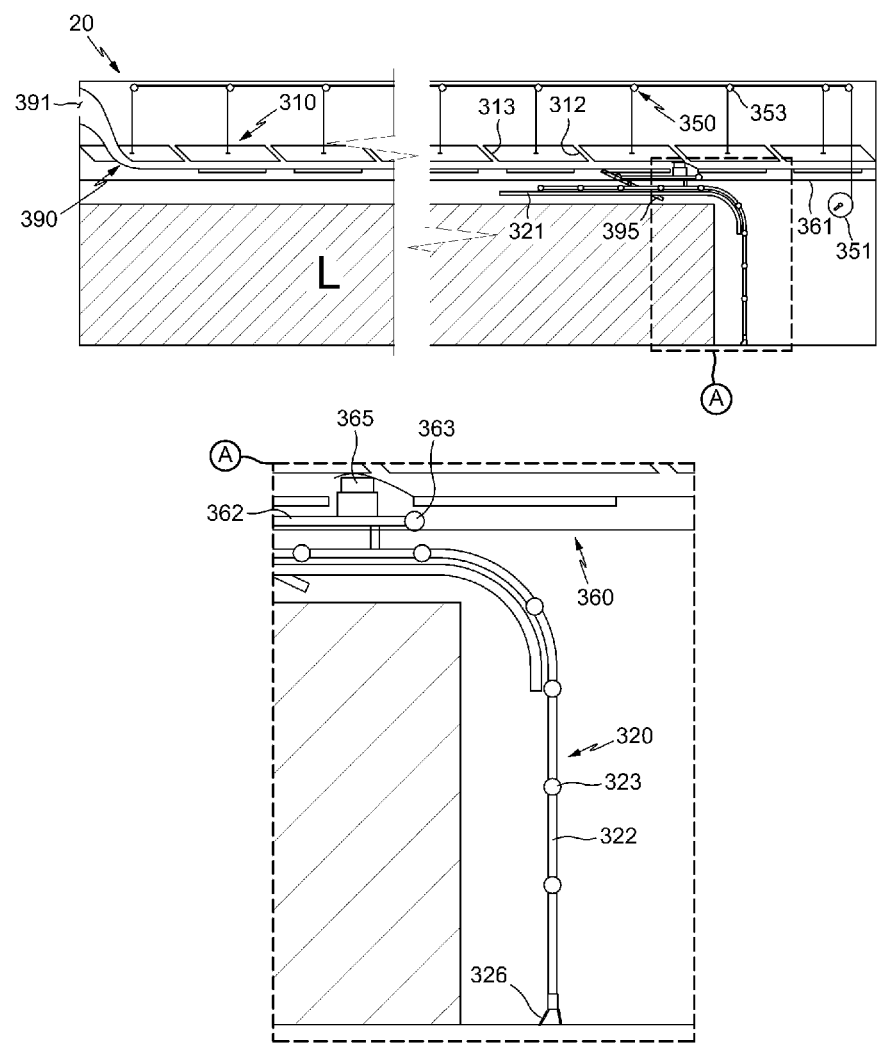
FIG. 27 is a view of a loading space variable refrigeration system of a refrigerator vehicle according to a third embodiment of the present invention.

FIG. 27 is a view of a loading space variable refrigeration system of a refrigerator vehicle according to a third embodiment of the present invention.

In the third embodiment of the present invention, an uncooling region (B) in a refrigeration trailer 20 is set by a single or a plurality of horizontal bulkheads 310 moving upwards and downwards and a vertical bulkhead 320 moving forwards and rearwards and operating as a roll-up gate moving upwards and downwards along tracks.

The third embodiment is different from the first embodiment in that the connector 130 is not necessary.

In description of the third embodiment, repetitious description of components having the same configuration as in the first and second embodiments will be omitted, and the following description is focused on the difference from the first and second embodiments.

The horizontal bulkheads 310 in the third embodiment have configuration similar to the horizontal bulkheads 110, 210 in the first and second embodiments. Particularly, the horizontal bulkheads 310 have the same configuration as those in the second embodiment in that all the horizontal bulkheads 310 are moved downwards to set the uncooling region (B).

Cool air is supplied to the refrigeration trailer 20 through a cool-air supply hole 391 provided at a front end thereof and transferred to an inner space of the refrigeration trailer 20 through a duct 390. The duct 390 in the third embodiment has the same configuration as the duct 290 in the second embodiment.

The vertical bulkhead 320 is a bendable structure in which a plurality of panels 322 made of a material to block air flow is sequentially connected to one another. More specifically, a connection part between the panels 322 may be bent by a hinge embedded therein and is provided with wheels 323. The vertical bulkhead 320 is supported by a support track 321 coupled to a transfer apparatus 360. The vertical bulkhead 320 normally stands by while being slid into the support track 321. Thereafter, the vertical bulkhead 320 is dragged down from the support track 321 and erected, thereby setting the uncooling region (B). That is, the vertical bulkhead 320 is a type of roll-up gate sliding along the support track 321. Each panel 322 of the vertical bulkhead 320 is formed at both sides thereof with foldable seals 324 to prevent cool air from leaking to the uncooling region (B) through both sides thereof. The panels 322 of the vertical bulkhead 320 may have different sizes for efficiency in operation. In addition, an air blocking section 326 for preventing leakage of cool air to the uncooling region (B) is formed at the distal panel 322 of the vertical bulkhead 320. The air blocking section 326 prevents leakage of cool air through a concave-convex pattern at the bottom of the refrigeration trailer 20 as in the first and second embodiments.

The vertical bulkhead 320 is moved forwards and rearwards by the transfer apparatus 360. The transfer apparatus 360 includes rails 361 secured to the lower surface of the horizontal bulkhead 310 and a movable guide 362 moving forwards and rearwards along the rails 361. The support track 321 is coupled to the movable guide 362, and when the movable guide 362 moves, the support track 321 and the vertical bulkhead 320 are moved together.

The movable guide 362 is placed on rollers 363 to smoothly slide along the rails 361.

The vertical bulkhead 320 on the support track 321 having moved along the rails 361 is dragged down, and the range of the uncooling region (B) is determined by a moving distance of the vertical bulkhead 320.

Operation of the loading space variable refrigeration system of a refrigerator vehicle according to the third embodiment of the present invention having the structure as described above will be specifically described below with reference to FIG. 28 briefly showing overall operation of the refrigeration system and FIGS. 29 to 33 showing detailed operation.

Figure 28:
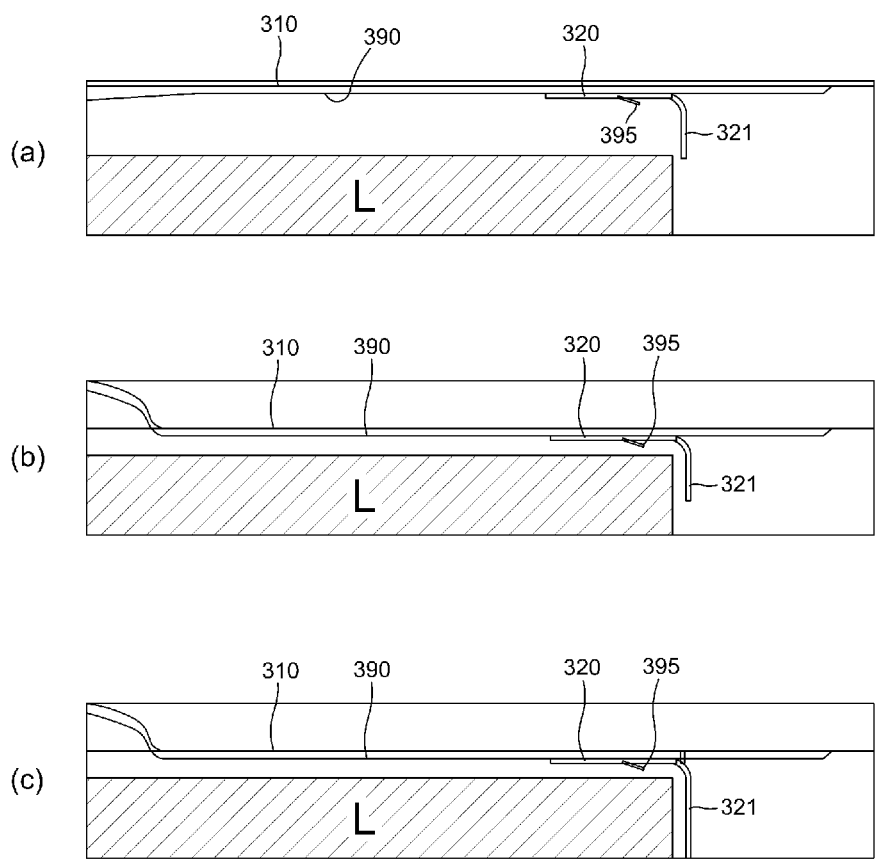
FIG. 28 is a view schematically showing overall operation of the loading space variable refrigeration system of a refrigerator vehicle according to the third embodiment of the present invention.

FIG. 28 is a view schematically showing overall operation of the loading space variable refrigeration system of a refrigerator vehicle according to the third embodiment of the present invention.

Referring to FIG. 28, when loads (L) are loaded in the refrigeration trailer 20, a main air passage 392 above the distal end portion of the loads (L) is open, and the vertical bulkhead 320 is moved to the distal end portion of the loads (L) by moving the movable guide 362 (See FIG. 28(a)). The horizontal bulkheads 310 are moved downwards to the height of the loads (L), together with the vertical bulkhead 320 connected thereto (See FIG. 28(b)). The vertical bulkhead 320 is dragged down such that a vertical length thereof is increased (See FIG. 28(c)). The overall operation of varying the loading space is completed.

As shown in FIG. 28(c), a clamp 365 on the movable guide 362 blocks off the main air passage 292 and auxiliary air passages 393, 394 above the distal end portion of the loads (L).

Although the vertical bulkhead 320 is installed after downward movement of the horizontal bulkheads 310, the vertical bulkhead 320 may also be installed before downward movement of the horizontal bulkheads 310.

Figure 29:
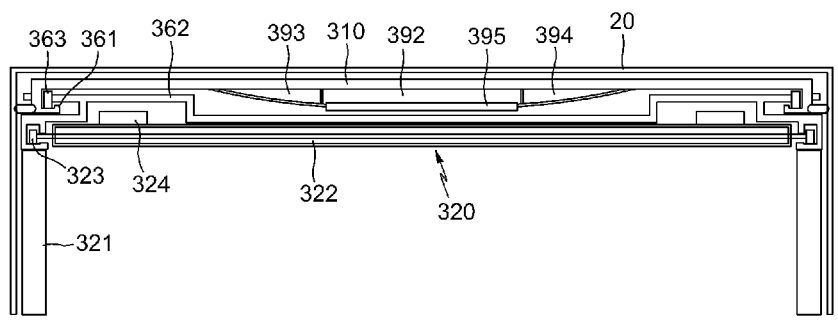
FIGS. 29 to 33 are views showing detailed operation of the loading space variable refrigeration system of a refrigerator vehicle according to the third embodiment of the present invention.
Figure 29:
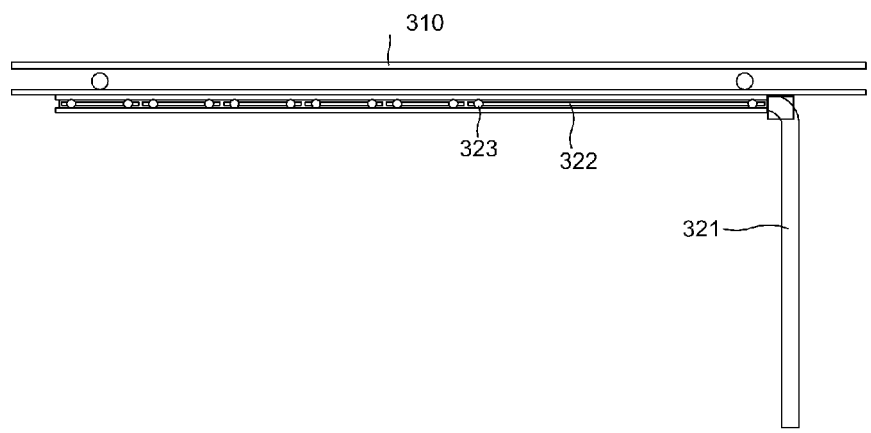

FIG. 29 is a view showing a structure of the vertical bulkhead 220 in the loading space variable refrigeration system of a refrigerator vehicle according to the third embodiment of the present invention.

FIG. 29(a) is a rear view showing the vertical bulkhead 220. Each of the horizontal bulkheads 320 is provided at both lower sides thereof with the rails 361, and the movable guide 362 is moved forwards and rearwards along the rails 361. The support track 321 is secured to the movable guide 362, and when the movable guide 362 moves, the support track 321 is also moved forwards and rearwards together. The wheels 323 of the shutter panels 322 constituting the vertical bulkhead 320 are embedded in the support track 321. Here, reference numeral 324 denotes foldable seals formed at both sides of each panel 322 to prevent leakage of cool air to the uncooling region (B) through both sides thereof.

FIG. 29(b) is a side view showing a state in which the shutter panels 322 constituting the vertical bulkhead 320 are parallel to the ceiling, namely, the horizontal bulkheads 310. The shutter panels 322 are moved along the support track 321, one portion of which is parallel to the horizontal bulkheads 310 and the other portion of which is perpendicular to the horizontal bulkheads 310. Therefore, although the shutter panels 322 does not play a role when placed at the portion of the support track 321 parallel to the horizontal bulkheads 310, the shutter panels 322 act as walls for blocking cool air moving in the vertical direction when placed at the portion of the support track 321 perpendicular to the horizontal bulkheads 310.

Figure 30:
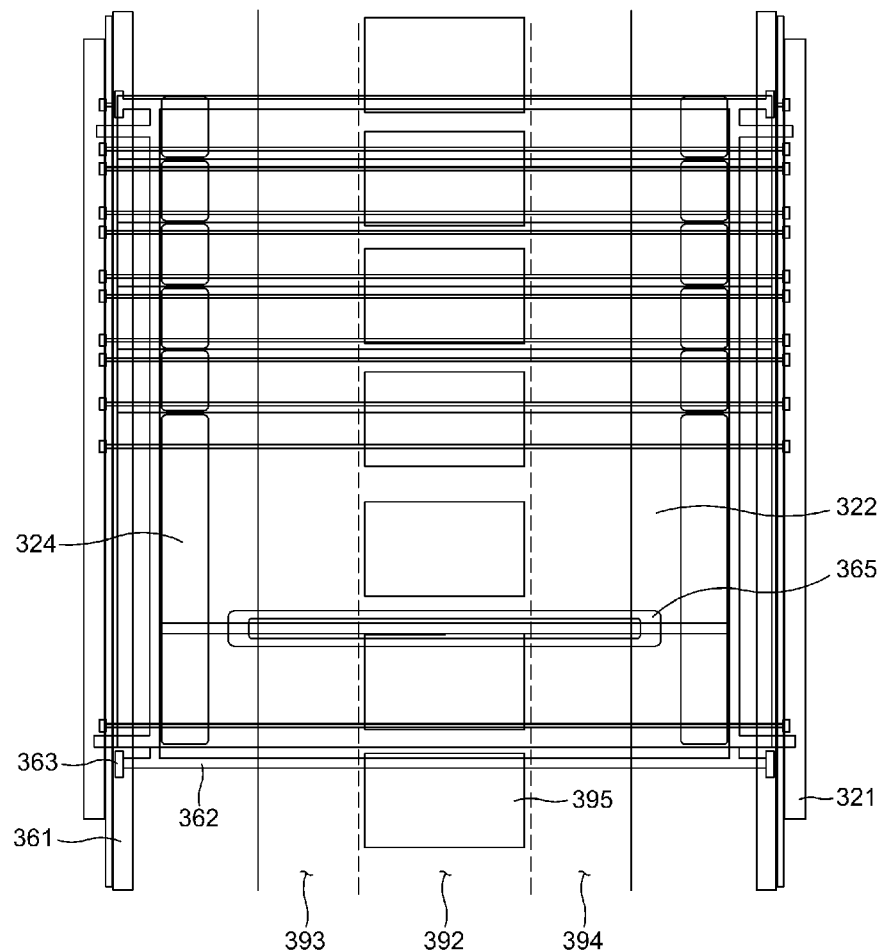
Figure 31:
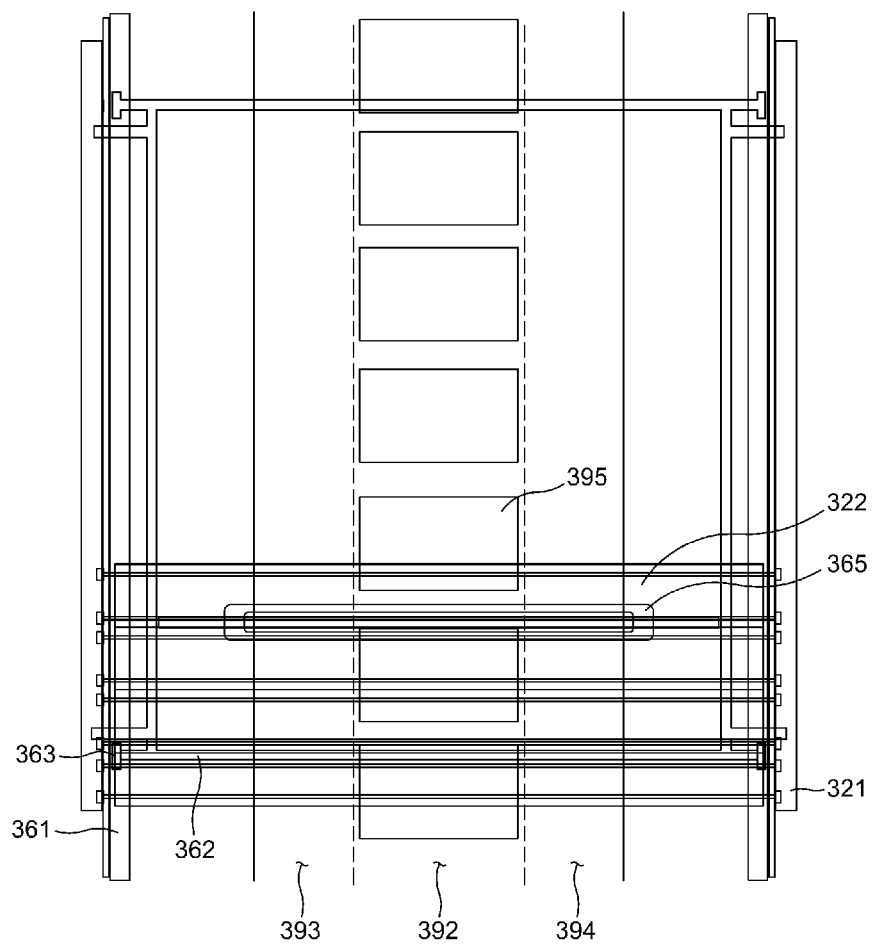

FIG. 30 is a plan view showing a state in which the vertical bulkhead 320 is parallel to the ceiling, namely, the horizontal bulkheads 310 in the loading space variable refrigeration system of a refrigerator vehicle according to the third embodiment of the present invention. In FIG. 31, the shutter panels 322 having different sizes are not yet moved downwards.

FIG. 31 is a plan view showing a state in which one portion of the vertical bulkhead 320 is moved downwards in the loading space variable refrigeration system of a refrigerator vehicle according to the third embodiment of the present invention. Referring to FIG. 31, some of the shutter panels 322 are moved downwards along the support track 321, as compared with FIG. 30. Accordingly, the rearmost opening/closing door 395 of the main air passage 392 is open, and the main air passage 392 and the auxiliary air passages 393, 394 above the distal end portion of the loads (L) are blocked by the clamp 365 of the moved transfer apparatus 360, such that cool air may be transferred only to the cooling space (A) in the refrigeration trailer 20.

Figure 32:
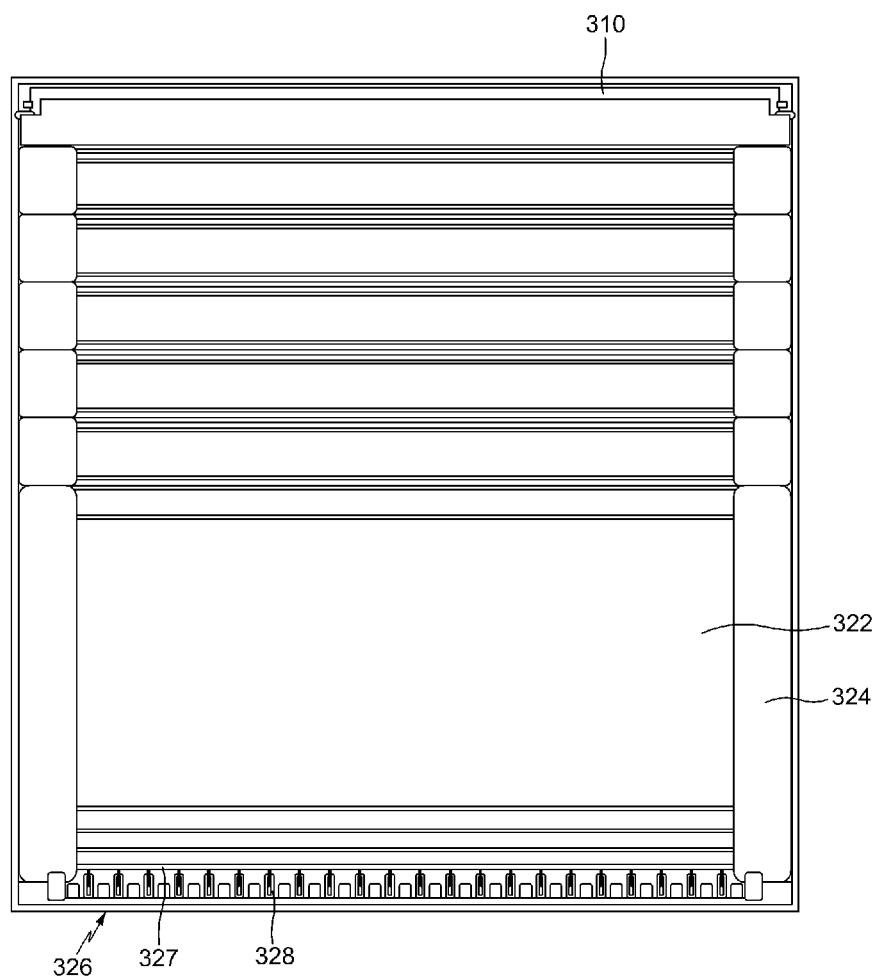
Figure 33:
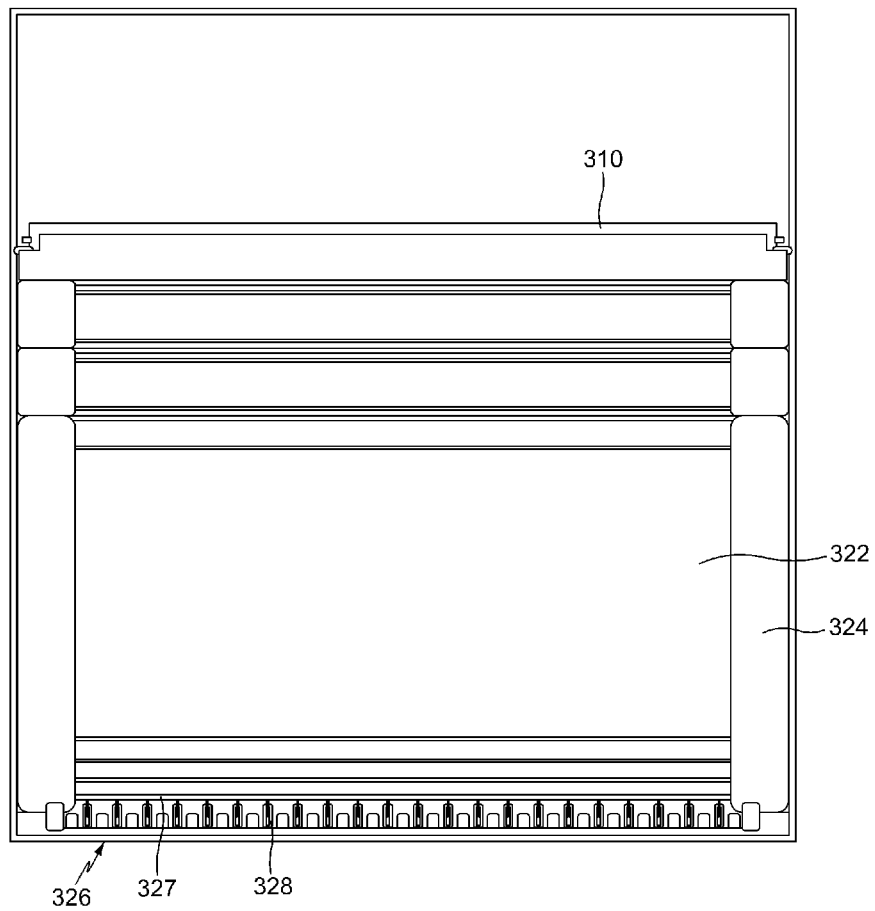

In FIG. 32, for better understanding, the vertical bulkhead 320 is moved downwards and erected without downward movement of the horizontal bulkheads 310, thereby setting the uncooling region (B). In contrast, in FIG. 33, the vertical bulkhead 320 is moved downwards and erected after downward movement of the horizontal bulkheads 310, thereby setting the uncooling region (B). As shown in FIGS. 32 and 33, the foldable seals 324 at both sides of each shutter panel 322 constituting the vertical bulkhead 320 are unfolded to contact the inner side surfaces of the refrigeration trailer 20, and the air blocking section 326 is provided at the lower end of the lowermost shutter panel such that seal brushes 328 thereof are inserted into depressions of the concave-convex pattern at the bottom of the trailer 20 to prevent cool air from being exhausted from the cooling space (A).

Embodiment 4

Figure 34:
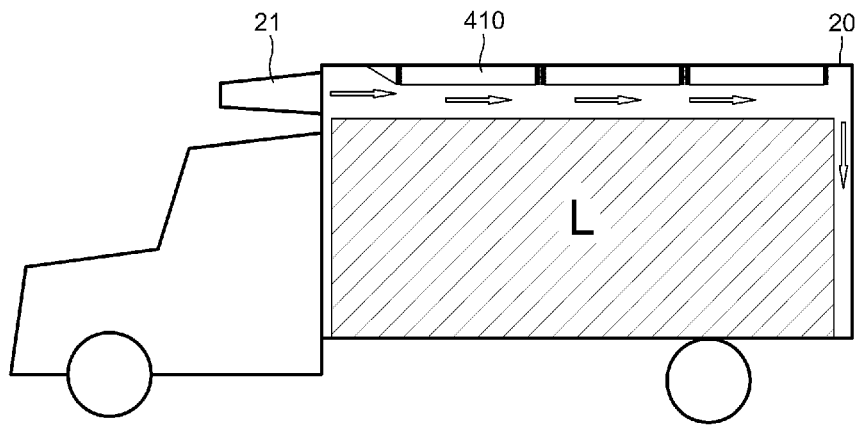
FIG. 34 is a view of a loading space variable refrigeration system of a refrigerator vehicle according to a fourth embodiment of the present invention.

FIG. 34 is a view of a loading space variable refrigeration system of a refrigerator vehicle according to a fourth embodiment of the present invention.

In the fourth embodiment of the present invention, an uncooling region (B) in a refrigeration trailer 20 is set by placing one or more space-occupying units, having an adjustable inner space, in the refrigeration trailer.

The space-occupying units are characterized by the inner space in which cooling is not performed, and a space to be cooled is reduced simply by adjusting the number and volume of space-occupying units present in the refrigeration trailer.

Here, any unit that can be disposed at the ceiling of the trailer and adjusted by expanding an inner space thereof, such as spatial partition structures 410 described below, may be used as the space-occupying units. However, it should be understood that the present invention is not limited thereto and any unit having an adjustable inner space, such as a balloon, may be used to adjust a cooling space (A) in the refrigeration trailer, as long as the unit can be placed in the trailer without being secured to the ceiling of the refrigeration trailer.

The space-occupying units to be described with reference to the drawings may be the spatial partition structures 410, and the uncooling region (B) in the refrigeration trailer 20 is set by the spatial partition structures 410 disposed at the ceiling of the trailer and having an expandable inner space.

The fourth embodiment is different from the other embodiments in that vertical and horizontal bulkheads are not required, and in the fourth embodiment, the uncooling region (B) is set by expanding the inner space of the selected spatial partition structures 410 to a desired degree.

The refrigeration systems having a variable loading space according to the first to third embodiments of the invention are suitable for large trailers in which an elongated duct supplying cool air into a refrigeration trailer is provided at the ceiling thereof. In contrast, the refrigeration system having a variable loading space according to the fourth embodiment of the invention is more suitable for straight trucks having no duct at the ceiling thereof and may also be applied to large trailers.

In the fourth embodiment of the invention, as an example of the refrigerator vehicle, a straight truck will be described in which cool air is supplied into a trailer 20 through a hole at the front end thereof instead of a separate duct and a concave-convex pattern is not formed at the bottom thereof.

The spatial partition structures 410 are secured to the ceiling of the refrigeration trailer 20. The spatial partition structures 410 may have the same width as the refrigeration trailer 20 and be arranged in a line along the longitudinal direction of the refrigeration trailer 20.

In another example, the spatial partition structures 410 may have a smaller width than the refrigeration trailer 20 and be arranged at the ceiling of the refrigeration trailer 20 in the longitudinal and lateral directions.

As shown in FIG. 34, the spatial partition structures 410, when not in use, are folded in the refrigeration trailer 20 in which loads (L) are loaded. In this case, the spatial partition structures 410 do not affect flow of cool air, and the cool air supplied from a refrigerator 21 may be supplied into the refrigeration trailer 20 as it is.

Figure 35:
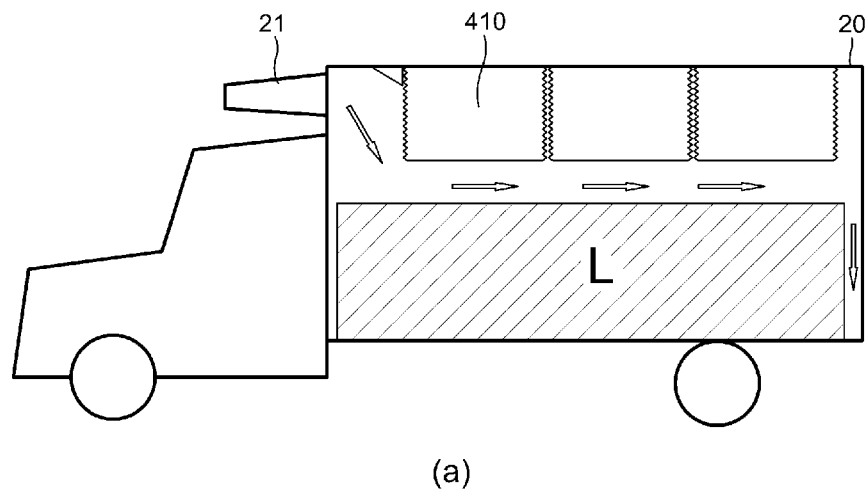
FIG. 35 is a view showing various operations of the loading space variable refrigeration system of a refrigerator vehicle according to the fourth embodiment of the present invention.
Figure 35:
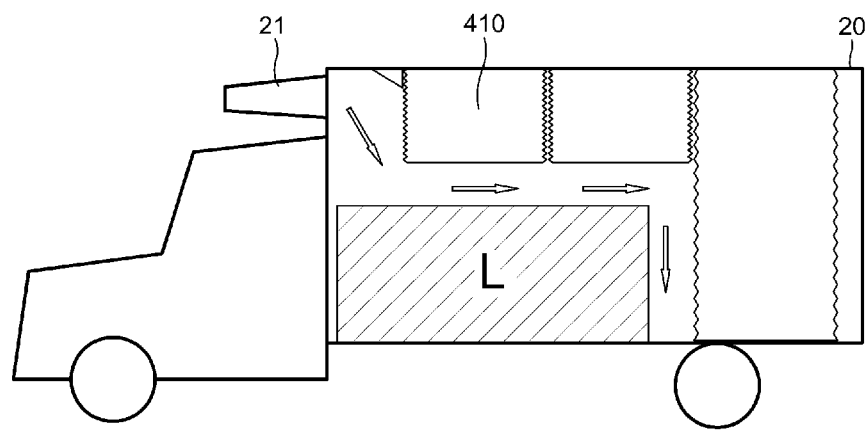

FIG. 35 is a view showing various operations of the loading space variable refrigeration system of a refrigerator vehicle according to the fourth embodiment of the present invention.

In FIG. 35(a), loads (L) are fully loaded at the bottom of the refrigeration trailer 20 and are lower in height than the ceiling of the refrigeration trailer 20. In this case, the spatial partition structures 410 are expanded such that lower end portions thereof closely approach the upper surfaces of the loads (L). Therefore, as shown in FIG. 35(a), a space of the refrigeration trailer 20 to be cooled by cool air may be a space except for the spatial partition structures 410 expanded at the same level.

In FIG. 35(b), loads (L) are partially loaded at the bottom of the refrigeration trailer 20 and are lower in height than the ceiling of the refrigeration trailer 20. In this case, some of the spatial partition structures 410 below which the loads (L) are present are expanded such that lower end portions thereof closely approach the upper surfaces of the loads (L). In addition, the rest of the spatial partition structures 410 below which the loads (L) are not present are expanded such that lower end portions thereof closely approach the bottom of the refrigeration trailer 20. Therefore, as shown in FIG. 35(b), a space of the refrigeration trailer 20 to be cooled by cool air may be a space except for the spatial partition structures 410 expanded by different levels. Particularly, the spatial partition structure 410 deformed such that the lower end portion thereof closely approaches the bottom of the refrigeration trailer 20 blocks flow of the cool air, like the vertical bulkheads in the first to third embodiments of the invention.

The spatial partition structures 410 may be formed of a material to block air flow between the inside and outside thereof and expanded by simple user manipulation.

Figure 36:
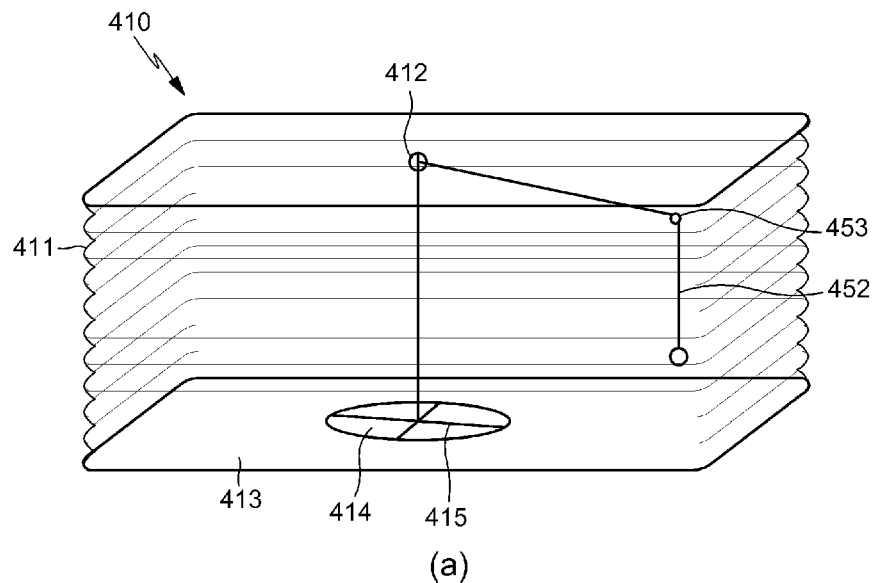
FIG. 36 is a view showing detailed operation of a spatial partition structure in the loading space variable refrigeration system of a refrigerator vehicle according to the fourth embodiment of the present invention.

As shown in FIG. 36, for expansion or contraction, each of the spatial partition structures 410 may have side surfaces formed of a corrugated wall 411 that can be folded or unfolded. Therefore, when the spatial partition structure 410 is filled with air, the corrugated walls 411 are unfolded, thereby expanding the spatial partition structure 410. In addition, when the air is discharged from the spatial partition structure 410 by folding the corrugated walls 411, the spatial partition structure 410 is contracted.

In order to control the state of the corrugated walls 411, the spatial partition structure 410 is provided at the upper portion thereof with an inner pulley 412, and a wire 451 passing over the inner pulley 412 is secured at one end thereof to a lower wall 413 of the spatial partition structure 410 and at the other end thereof to a control key 454 via an outer pulley 453 outside the spatial partition structure 410.

Therefore, as shown in FIG. 36(a), when an operator unwinds the wire 452 through the control key 454 before cool air is supplied into the refrigeration trailer 20, the lower wall 413 of the spatial partition structure 410 is moved downwards and thus, the corrugated walls 411 are unfolded. In this way, the uncooling region (B) is set by the spatial partition structure 410. In contrast, as shown in FIG. 36(b), when an operator pulls the wire 452 through the control key 454 once the refrigeration trailer 20 is completely cooled, the lower wall 413 of the spatial partition structure 410 is moved upwards and thus, the corrugated walls 411 are folded. In this way, the uncooling region (B) having been set by the spatial partition structure 410 is cancelled.

That is, tension of the wire may be controlled through the control key 454 by an operator, thereby adjusting the volume of the spatial partition structure 410.

An opening 414 may be formed at the lower wall 413 of the spatial partition structure 410 such that the spatial partition structure 410 may be smoothly expanded and contracted. That is because, when the spatial partition structure 410 is completely sealed, a serious difference in air density occurs due to a temperature difference between the inside and outside of the spatial partition structure 410, thereby causing serious deformation of the spatial partition structure 410. Except for intense cold conditions, cool (heavy) air does not easily flow into the spatial partition structure 410 through the opening 414, and therefore a setting effect of the uncooling region (B) through the spatial partition structure 410 is rarely reduced.

Embodiment 5

Figure 37:
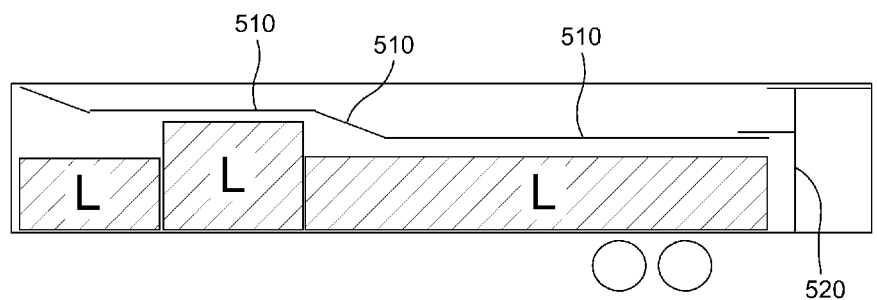
FIGS. 37 and 38 are views showing a loading space variable refrigeration system of a refrigerator vehicle according to a fifth embodiment of the present invention.
Figure 38:
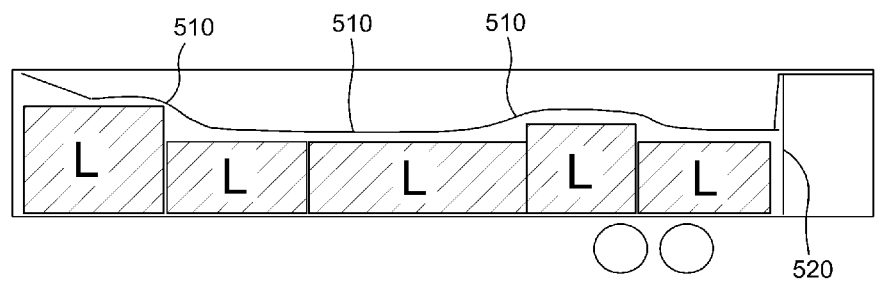

FIGS. 37 and 38 are views showing a loading space variable refrigeration system of a refrigerator vehicle according to a fifth embodiment of the present invention.

In practice, loads of different sizes are loaded in a refrigeration trailer 20. In most cases, loads having different heights are loaded in the refrigeration trailer, instead of only one type of load, and therefore the heights of the loads (L) in the trailer are not uniform. If the horizontal bulkheads 110, 210, 310 according to the first to third embodiments of the invention are used in this case, the horizontal bulkheads are moved downwards only to the highest load (L), thereby allowing an unnecessary cooling space to be set together therein.

In this embodiment conceived to solve the problem, as shown in FIGS. 37 and 38, horizontal bulkheads 510 dividing an upper region in the refrigeration trailer 20 are configured to flexibly correspond to the shape in which loads (L) irregularly protrude upwards, instead of having the same height corresponding to the highest load.

As shown in FIG. 37, the plural horizontal bulkheads 510 are connected to one another and divide the upper region in the trailer. An uncooling region (B) in the refrigeration trailer 20 using the loading space variable refrigeration system of a refrigerator vehicle is set by the unit horizontal bulkheads 510 individually moving upwards and downwards and changing positions thereof and a vertical bulkhead 520 moving forwards and rearwards.

In the embodiment of FIG. 37, the unit horizontal bulkheads 510 may be individually moved upwards and downwards and freely perform position change (rotation). In the previous embodiments, the horizontal bulkheads 110, 210, 310 are moved downwards to the same height in the same position to fit the highest load (L). However, in this embodiment shown in FIG. 37, the uncooling region (B) may be set by the unit horizontal bulkheads 510 connected to one another, and the heights and positions of the unit horizontal bulkheads 510 are flexibly adjusted according to operator control to fit the heights of the loads (L) in the refrigeration trailer 20.

As a result, it is possible to minimize an unnecessary cooling space, thereby further minimizing energy (heat or fuel) consumption for cooling.

In addition, as shown in FIG. 38, horizontal bulkheads 510 made of a flexible material are moved downwards to fit heights of loads (L) in a refrigeration trailer 20 and then partially deformed according to operator control, thereby optimally setting a cooling space (A).

Exemplary embodiments of the invention have been disclosed in the drawings and specification. The specific terms used herein are provided for the purpose of describing particular embodiments only and are not intended to limit the scope of the present invention disclosed in the claims. Accordingly, it should be understood by those skilled in the art that various modifications, changes, and alterations can be made without departing from the spirit and scope of the invention. Therefore, the scope of the present invention should be limited only by the accompanying claims and equivalents thereof.

The invention claimed is:

1. A loading space variable refrigeration system of a refrigerator vehicle, comprising:
   a horizontal bulkhead defining an upper space in a refrigeration trailer; and
   a vertical bulkhead defining a rear space in the refrigeration trailer,
   wherein an uncooling region is set in a cooling space of the refrigeration trailer by the horizontal and vertical bulkheads, wherein the horizontal bulkhead is moved upwards and downwards in the refrigeration trailer to set a lower cooling space to which cool air is transferred and an upper uncooling region to which cool air is not transferred.

2. The refrigeration system according to claim 1, wherein the vertical bulkhead is moved forwards and rearwards in the refrigeration trailer to set a front cooling space to which cool air is transferred and a rear uncooling region to which cool air is not transferred.

3. The refrigeration system according to claim 1, wherein a plurality of horizontal bulkheads is arranged parallel to a ceiling of the refrigeration trailer in a horizontal direction, and the horizontal bulkheads selected according to operator control or all the horizontal bulkheads are moved downwards.

4. The refrigeration system according to claim 3, wherein the horizontal bulkheads have a plate-shaped structure made of a material to block air flow.

5. The refrigeration system according to claim 4, wherein each of the horizontal bulkheads is provided on an upper surface thereof with an insertion portion and has inclined front and rear sides, the front side being formed as an inclined support surface supporting another horizontal bulkhead opposite thereto and the rear side being formed as an inclined coupling surface supported by another horizontal bulkhead opposite thereto.

6. The refrigeration system according to claim 5, further comprising:
   a hoist moving all the horizontal bulkheads or the selected horizontal bulkheads upwards and downwards,
   wherein the hoist comprises:
   a control key controlled by an operator;
   a plurality of wires wound or unwound by rotation of the control key; and
   pulleys disposed above the horizontal bulkheads such that the wires are wound therearound,
   wherein each wire passing over the corresponding pulley is secured at a distal end thereof to the corresponding horizontal bulkhead, and when the control key is rotated to unwind the wire, the horizontal bulkhead connected to the wire is moved downwards.

7. The refrigeration system according to claim 6, wherein the trailer comprises side surfaces,
   stopping pieces are formed at both sides of each horizontal bulkhead facing the side surfaces of the trailer,
   stoppers that are to be changed in position are provided on the side surfaces of the trailer facing the stopping pieces of the horizontal bulkhead to selectively move the horizontal bulkhead downwards, and
   the stoppers are switched to a lock position against the specific horizontal bulkhead such that the stopping pieces of the corresponding horizontal bulkhead are stopped by the stoppers, which prevents the horizontal bulkhead from moving downwards.

8. The refrigeration system according to claim 1, wherein the horizontal bulkhead comprises a plurality of unit horizontal bulkheads that are moved upwards and downwards and to be changed in position, and heights and positions of the unit horizontal bulkheads are adjusted by operator control to conform to heights according to horizontal positions of loads in the refrigeration trailer.

9. The refrigeration system according to claim 1, wherein the horizontal bulkhead is formed of a flexible material and partially deformed by operator control to conform to heights according to horizontal positions of loads.

10. The refrigeration system according to claim 1, wherein cool air is supplied through a cool-air supply hole provided at a front end of the refrigeration trailer and transferred to an inner space of the refrigeration trailer through a duct provided on a lower surface of the horizontal bulkhead, and a front end portion of the duct is formed of an extensible flexible material or a bellows tube.

11. The refrigeration system according to claim 10, wherein the duct is secured to the lower surface of the horizontal bulkhead and divided into a plurality of parts that are separated from one another according to selective upward and downward movement of horizontal bulkheads, and the cool air is discharged from the duct secured to the rearmost of the lowered horizontal bulkheads.

12. The refrigeration system according to claim 10, wherein the duct is secured to the lower surface of the horizontal bulkhead and comprises a main air passage formed in a longitudinal direction of the refrigeration trailer and auxiliary air passages formed at left and right sides of the main air passage, wherein the main air passage discharges the cool air to a rear end of the refrigeration trailer, and the auxiliary air passages discharge the cool air through a plurality of through-holes formed on side surfaces thereof.

13. The refrigeration system according to claim 12, wherein the main air passage is divided into a plurality of parts in the longitudinal direction of the refrigeration trailer, each of which has an opening/closing door capable of discharging the cool air.

14. The refrigeration system according to claim 1, wherein the vertical bulkhead which is to be rotated by a rotating shaft secured to an upper inner surface of the refrigeration trailer normally makes surface-to-surface contact with an inner surface of the trailer and, in setting an uncooling region, is rotated about the rotating shaft and arranged parallel to a gate of the refrigeration trailer.

15. The refrigeration system according to claim 14, wherein the vertical bulkhead is a plate-shaped structure made of a material to block air flow.

16. The refrigeration system according to claim 15, wherein an air blocking section formed in a concave-convex pattern corresponding to that of a bottom surface of the trailer is attached to a lower portion of the vertical bulkhead.

17. The refrigeration system according to claim 14, further comprising:
a transfer apparatus moving the vertical bulkhead forwards and rearwards, wherein the transfer apparatus comprises:
a rail secured to a lower surface of the horizontal bulkhead; and
a movable guide moving forwards and rearwards along the rail;
wherein the rotating shaft supporting the vertical bulkhead is connected at an upper end thereof to the movable guide and moved forwards and rearwards by the movable guide.

18. The refrigeration system according to claim 17, further comprising: a connector serving as an auxiliary upper closing member for the horizontal bulkhead.

19. The refrigeration system according to claim 18, wherein the connector is a plate-shaped structure made of a material to block air flow.

20. The refrigeration system according to claim 19, wherein the connector is suspended from the movable guide of the transfer apparatus by the wire while being parallel to a ceiling of the refrigeration trailer, moved downwards according to movement of the movable guide and operator manipulation of the wire, and is inserted into an insertion portion of the horizontal bulkhead to subsidiarily determine a height of the uncooling region.

21. The refrigeration system according to claim 1, wherein the vertical bulkhead comprises:
an upper sliding plate; and
a lower sliding plate engaged with the upper sliding plate and sliding thereon,
wherein the vertical bulkhead is normally secured to a horizontal bulkhead side while being parallel to the horizontal bulkhead, with the upper and lower sliding plates superposed on each other, and in setting an uncooling region, erected with the lower sliding plate sliding downward on the upper sliding plate.

22. The refrigeration system according to claim 21, wherein the upper sliding plate is formed at a distal end thereof with a clamp pressing a duct, through which cool air flows, while the corresponding vertical bulkhead is erected.

23. The refrigeration system according to claim 21, wherein the upper sliding plate is formed at both sides thereof with upper foldable seals to prevent cool air from leaking to the uncooling region through both sides thereof, and the lower sliding plate is formed at both sides thereof with lower foldable seals to prevent the cool air from leaking to the uncooling region through both sides thereof.

24. The refrigeration system according to claim 21, wherein an air blocking section formed in a concave-convex pattern corresponding to that of a bottom surface of the trailer is attached to a distal end of the lower sliding plate.

25. The refrigeration system according to claim 21, further comprising:
a transfer apparatus moving the vertical bulkhead forwards and rearwards,
wherein the transfer apparatus comprises:
a rail secured to a lower surface of the horizontal bulkhead; and
a movable guide moving forwards and rearwards along the rail;
wherein the upper sliding plate of the vertical bulkhead is rotatably coupled to the movable guide and moved forwards and rearwards by the movable guide.

26. The refrigeration system according to claim 1, wherein the vertical bulkhead comprises:
a plurality of panels sequentially connected to one another and formed to be bendable,
wherein all the panels are normally secured to a horizontal bulkhead side while being parallel to the horizontal bulkhead and erected to set an uncooling region.

27. The refrigeration system according to claim 26, wherein each of the panels is formed at both sides thereof with foldable seals to prevent cool air from leaking to the uncooling region through both sides thereof.

28. The refrigeration system according to claim 26, wherein an air blocking section formed in a concave-convex pattern corresponding to that of a bottom surface of the trailer is attached to the lowermost panel of the vertical bulkhead.

29. The refrigeration system according to claim 26, wherein the vertical bulkhead comprises an upper sliding plate, and further comprising:
a transfer apparatus moving the vertical bulkhead forwards and rearwards,
wherein the transfer apparatus comprises:
a rail secured to a lower surface of the horizontal bulkhead;
a movable guide moving forwards and rearwards along the rail;
a support track coupled to the movable guide; and
a clamp secured to an upper portion of the movable guide and pressing a duct through which cool air flows, wherein the upper sliding plate of the vertical bulkhead is rotatably coupled to the movable guide and moved forwards and rearwards by the movable guide.

30. A loading space variable refrigeration system of a refrigerator vehicle, wherein an uncooling region in a refrigeration trailer is set by placing one or more space-occupying units, having an adjustable inner space, in the refrigeration trailer; wherein the space-occupying units comprise spatial partition structures disposed at a ceiling of the refrigeration trailer and having an expandable inner space, and the uncooling region is set by adjusting the inner space of the selected spatial partition structures, and wherein the spatial partition structures are normally contracted, and the uncooling region is set by expanding the selected spatial partition structures, and wherein the spatial partition structures have side surfaces formed of a corrugated wall that is to be folded or unfolded.

31. The refrigeration system according to claim 30, wherein each of the spatial partition structures is provided at an upper portion thereof with an inner pulley, a wire passing over the inner pulley is secured at one end thereof to a lower wall of the spatial partition structure and at the other end thereof to a control key via an outer pulley outside the spatial partition structure such that tension of the wire is controlled through the control key to adjust volume of the spatial partition structure.

* * * * *